(12) United States Patent
Robinson et al.

(10) Patent No.: US 8,321,948 B2
(45) Date of Patent: Nov. 27, 2012

(54) FLEXIBLE APPLIANCE HOSTING WITH COORDINATION OF DEPLOYMENT, LICENSING AND CONFIGURATION

(75) Inventors: Philip Robinson, Newtownabbey (GB); Benoit Hudzia, Belfast (GB)

(73) Assignee: SAP AG, Walldorf (DE)

( * ) Notice: Subject to any disclaimer, the term of this patent is extended or adjusted under 35 U.S.C. 154(b) by 1083 days.

(21) Appl. No.: 12/058,273

(22) Filed: Mar. 28, 2008

(65) Prior Publication Data
US 2009/0249488 A1 Oct. 1, 2009

(51) Int. Cl.
*H04L 29/06* (2006.01)
(52) U.S. Cl. ........... 726/26; 726/27; 726/28; 726/29; 726/30; 705/59; 705/51
(58) Field of Classification Search .............. None
See application file for complete search history.

(56) References Cited

U.S. PATENT DOCUMENTS

| | | | |
|---|---|---|---|
| 7,346,585 B1 * | 3/2008 | Alabraba et al. ............ 705/59 |
| 7,398,557 B2 * | 7/2008 | de Jong ........................ 726/29 |
| 7,610,631 B2 * | 10/2009 | Frank et al. .................. 726/30 |
| 7,797,678 B2 * | 9/2010 | Moulckers et al. .......... 717/121 |
| 7,809,648 B2 * | 10/2010 | Misra et al. .................. 705/59 |
| 7,853,790 B2 * | 12/2010 | Gabryjelski et al. ........ 713/175 |
| 8,032,409 B1 * | 10/2011 | Mikurak ................... 705/14.26 |
| 8,090,662 B2 * | 1/2012 | Pence et al. .................. 705/59 |
| 8,099,365 B2 * | 1/2012 | Bhambri et al. ............. 705/59 |
| 8,103,593 B2 * | 1/2012 | Kim .............................. 705/59 |
| 8,151,342 B2 * | 4/2012 | Choi et al. ................... 726/16 |
| 8,196,210 B2 * | 6/2012 | Sterin .......................... 726/26 |
| 8,229,858 B1 * | 7/2012 | Mazza et al. ................. 705/59 |
| 2003/0018582 A1 * | 1/2003 | Yaacovi ...................... 705/51 |
| 2004/0039916 A1 * | 2/2004 | Aldis et al. .................. 713/177 |
| 2005/0044016 A1 * | 2/2005 | Irwin et al. .................. 705/30 |
| 2005/0060561 A1 * | 3/2005 | Pearson et al. ............. 713/194 |
| 2005/0060568 A1 * | 3/2005 | Beresnevichiene et al. .. 713/200 |
| 2005/0102240 A1 * | 5/2005 | Misra et al. .................. 705/59 |
| 2005/0188071 A1 * | 8/2005 | Childress et al. .......... 709/223 |
| 2006/0005256 A1 * | 1/2006 | Cox ............................. 726/27 |
| 2006/0059099 A1 * | 3/2006 | Ronning et al. ............. 705/59 |
| 2006/0224250 A1 * | 10/2006 | Callaghan ..................... 700/1 |
| 2006/0229994 A1 * | 10/2006 | Moulckers et al. .......... 705/59 |
| 2007/0180490 A1 * | 8/2007 | Renzi et al. ................... 726/1 |
| 2008/0215468 A1 * | 9/2008 | Monsa-Chermon et al. ... 705/34 |
| 2009/0228984 A1 * | 9/2009 | Sterin ........................... 726/26 |

OTHER PUBLICATIONS

"The Integrit Project", SourceForge, Inc., retrieved from http://web.archive.org/web/20080103055018/http://integrit.sourceforge.net/, Jan. 3, 2008, 4 pages.

(Continued)

*Primary Examiner* — Syed A. Zia
(74) *Attorney, Agent, or Firm* — Brake Hughes Bellermann LLP

(57) ABSTRACT

Operating parameters of one or more software appliances may be set at a configuration manager. Compliance of the one or more software appliances with license terms may be maintained at a license manager. Communications may be executed between the license manager and the configuration manager to maintain compliance of the operating parameters with the license terms. A user interface may be provided for administration of the one or more software appliances therewith, the administration including deployment of the one or more software appliances, the license manager, the configuration manager, and a deployment manager within a system landscape. Communication may be executed between the license manager and the deployment manager to maintain compliance of the administration of the one or more software appliances with the license terms. Communication may be executed between the deployment manager and the configuration manager to manage the deployment relative to the operating parameters.

20 Claims, 22 Drawing Sheets

OTHER PUBLICATIONS

"ProtexIP", Black Duck Software, Inc., retrieved from http://web.archive.org/web/20071006082206/http://www.blackducksoftware.com/protexip, Oct. 9, 2007, 4 pages.

"AIDE", retrieved from http://web.archive.org/web/20070701150418/http://www.cs.tut.fi/~rammer/aide.html, Jul. 1, 2007, 4 pages.

"AIDE", SourceForge, Inc., retrieved from http://web.archive.org/web/20080117112635/http://sourceforge.net/projects/aide, Jan. 17, 2008, 2 pages.

"FCheck", Copyright 1996-2000 Michael A. Gumienny, retrieved from http://web.archive.org/web/20070213060046/http://www.geocities.com/fcheck2000/fcheck.html, Feb. 13, 2007, 3 pages.

WMware, "Transform IT Infrastructure with Enterprise-Class Virtualization", Copyright 2007, retrieved from http://web.archive.org/web/20070929090917/http://www.vmware.com/products/vi/, Sep. 29, 2007, 2 pages.

"VMware Infrastructure 3—Data Center Management and Optimization Suite", Brochure, VMware, Inc., Copyright 1998-2007, 4 pages.

"System Center Configuration Manager 2007", Microsoft, retrieved from http://web.archive.org/web/20080313170510/http://www.microsoft.com/smserver/default.mspx, Mar. 13, 2008, 2 pages.

"VeriCentre Appliance Management Suite", Verifone, retrieved from http://web.archive.org/web/20071024083617/http://www.verifone.com/products/multiapp/vericentre.html, Oct. 24, 2007, 1 p.

"Enomalism Virtualized Management Dashboard (VMD)", Enomaly Inc., retrieved from http://web.archive.org/web/20071230141745/http://www.enomalism.com/#Enomalism_Version_0.6.X_Installation_Instructions, Dec. 30, 2007, 2 pages.

"Virtual Iron Software", Copyright 2003-2007 Virtual Iron Software, Inc., retrieved from http://web.archive.org/web/20070928061807/http://www.virtualiron.com/products/index.cfm, Sep. 28, 2007, 2 pages.

"Red Hat to Build Virtual Appliance OS for Managing Intel vPro-Based Desktops", Red Hat, Inc., retrieved from http://web.archive.org/web/20080216113417/http://www.redhat.com/about/news/prarchive/2007/vpro_appliance.html, Feb. 16, 2008, 3 pages.

"IBM Tivoli License Manager", IBM, retrieved from http://web.archive.org/web/20071021023947/http://www-306.ibm.com/software/tivoli/products/license-mgr/, Oct. 21, 2007, 3 pages.

"Software License Management With Sentinel RMS", SafeNet Inc., retrieved from http://web.archive.org/web/20071023183223/http://www.safenet-inc.com/products/sentinel/Sentinel_RMS.asp, Oct. 23, 2007, 2 pages.

"Macrovision Licensing Products", Macrovision Corporation, retrieved from http://web.archive.org/web/20080226205423/http://www.macrovision.com/products/1156.htm?, Feb. 26, 2008, 1 page.

"License Compliance", ManageSoft Corp., retrieved from http://web.archive.org/web/20070820210818/http://www.managesoft.com/solution/licensing/index.xml, Aug. 20, 2007, 1 page.

"Centennial Software: IT Asset Management and Endpoint Security Solutions", Centennial Software Limited, retrieved from http://web.archive.org/web/20071223103129/http://www.centennial-software.com/products/license_manager/, Dec. 23, 2007, 4 pages.

"Irnis on the Net", 2001 Irnis Haliullin, retrieved from http://web.archive.org/web/20071225170214/http://www.irnis.net/?, Dec. 25, 2007, 2 pages.

"K2 Key Auditor & Key Server", retrieved from http://web.archive.org/web/20080217132844/http://www.sassafras.com/licensing.html, Feb. 17, 2008, 2 pages.

"Software License Tracking", Adventnet, Inc., retrieved from http://web.archive.org/web/20070220150045/http://www.manageengine.com/products/service-desk/software-license-tracking.html, Feb. 20, 2007, 2 pages.

"License Use Management", retrieved from http://web.archive.org/web/20080208084648/http://www-306.ibm.com/software/awdtools/lum/, Feb. 8, 2008, 1 page.

"Software License Management", retrieved from http://web.archive.org/web/20080204135924/http://www.appstream.com/products-license-management.html, Feb. 4, 2008, 3 pages.

"FLEXnet Connect", Macrovision Corporation, retrieved from http://web.archive.org/web/20080215161437/http://www.macrovision.com/products/licensing/flexnet_connect.htm, Feb. 15, 2008, 3 pages.

"Security and Patch Management", ManageSoft Corp., retrieved from http://web.archive.org/web/20070820170633/http://www.managesoft.com/solution/suite/itsecurity/index.xml, Aug. 20, 2007, 1 page.

"Codework Products", retrieved from http://web.archive.org/web/20080219044900/http://www.codework.com/, Feb. 19, 2008, 1 page.

"Novell ZENworks Desktop Management", Novell, Inc., retrieved from http://web.archive.org/web/20070830015951/http://www.novell.com/products/zenworks/desktops/, Aug. 30, 2007, 1 page.

"Prism Patch Manager®", New Boundary Technologies, retrieved from http://web.archive.org/web/20080221054736/http://www.newboundary.com/products/prismpatch/index.htm, Feb. 21, 2008, 1 page.

"Novell ZENworks Patch Management", Novell, Inc., retrieved from http://web.archive.org/web/20071025132447/http://www.novell.com/products/zenworks/patchmanagement/, Oct. 25, 2007, 1 page.

"SecureCentral PatchQuest 4", AdventNet, Inc., retrieved from http://web.archive.org/web/20070525103350/http://www.securecentral.com/products/patchquest/, May 25, 2007, 2 pages.

"Step-by-Step Guide to Remote OS Installation", Microsoft Corporation, retrieved from http://web.archive.org/web/20080205031504/http://technet.microsoft.com/en-us/library/bb742378.aspx, Feb. 5, 2008, © pages.

XSADMIN, retrieved from http://web.archive.org/web/20070910215303/http://xsadmin.simplenetwks.com/, Sep. 10, 2007, 3 pages.

"WPKG", retrieved from http://web.archive.org/web/20071119142758/http://wpkg.org/Main_Page, Nov. 19, 2007, 1 page.

"Xyro B4 Software", retrieved from http://web.archive.org/web/20071128144639/http://www.xyro.com/fidimuc.html, Dec. 28, 2007, 2 pages.

"Altiris Deployment Solutions", Altiris Inc., retrieved from http://web.archive.org/web/20080219041910/http://www.codework.com/express/product.html, Feb. 19, 2008, 1 page.

"LANDesk Management Suite", LANDesk Software, retrieved from http://web.archive.org/web/20070413085557/http://www.landesk.com/products/ldms/index.aspx, Apr. 13, 2007, 3 pages.

"DSView 3 Management Software", Avocent, retrieved from http://web.archive.org/web/20080120025149/http://www.avocent.com/DSView3.aspx?linkidentifier=id&itemid=3630, Jan. 20, 2008, 1 page.

"Veritas Configuration Manager", Symantec Corporation, retrieved from http://web.archive.org/web/20070906070538/http://www.symantec.com/enterprise/products/overview.jsp?pcid=2247&pvid=1461_1, Sep. 6, 2007, 4 pages.

"RemoteScope—Remote Desktop Management", Micro2000, retrieved from http://web.archive.org/web/20071221084006/http://www.micro2000.com/remotescope/index.php, Dec. 21, 2007, 2 pages.

"Altiris RapiDeploy", Altiris Inc., retrieved from http://web.archive.org/web/20080229014737/http://www.codework.com/rapideploy/product.html, Feb. 29, 2008, 1 page.

"BridgeWays Deployment and Management Edition 2.0 (DME)", Xandros Incorporated, retrieved from http://web.archive.org/web/20080225171855/http://www.xandros.com/products/business/bridgeways/editions/deploy_mgmt_edition.html, Feb. 25, 2008, 1 page.

"Windows Deployment", ManageSoft Corp., retrieved from http://web.archive.org/web/20070820195636/http://www.managesoft.com/solution/windowsmigration/index.xml, Aug. 20, 2007, 2 pages.

"Extensions: Remote Deployment Manager", IBM, retrieved from http://web.archive.org/web/20071014033523/http://www-03.ibm.com/systems/management/director/extensions/rdm.html, Oct. 14, 2007, 2 pages.

"ProLiant Essentials Rapid Deployment Pack", Hewlett-Packard Development Company, L.P., retrieved from http://web.archive.org/ web/20070126130543/http://h18000.www1.hp.com/products/servers/management/rdp.html, Jan. 26, 2007, 2 pages.

"Symantec LiveState Delivery 6.0 overview", Symantec Corporation, retrieved from http://www.symantec.com/business/support/index?page=content&id=TECH109119&key=52029&actp=LIST, Jan. 4, 2005, 2 pages.

"Prism Deploy", New Boundary Technologies, retrieved from http://web.archive.org/web/20070921153423/http://www.newboundary.com/products/prismdeploy/, Sep. 21, 2007, 1 page.

"rPath Appliance Platform/Update Service:Appliance", rPath, Inc., retrieved from http://web.archive.org/web/20070320131638/http://wiki.rpath.com/wiki/rPath_Appliance_Platform/Update_Service:Appliance, Mar. 20, 2007, 1 page.

rPath, rPath, Inc., retrieved from http://web.archive.org/web/20070711080620/http://www.rpath.com/corp/#, Jul. 11, 2007, 1 page.

"rPath Technical Guide:Creating Appliances", rPath, Inc., retrieved from http://web.archive.org/web/20071221033058/http://wiki.rpath.com/wiki/rPath_Technical_Guide:Creating_Appliances, Dec. 21, 2007, 1 page.

"BMC Patch Manager", Product Datasheet, 2005 BMC Software, Inc., 2 pages.

"PatchLink Update", PatchLink Corporation, retrieved from http://web.archive.org/web/20070820234502/http://www.patchlink.com/products/update.aspx, Aug. 20, 2007, 7 pages.

Bradshaw, et al, "A Scalable Approach to Deploying and Managing Appliances", Teragrid 2007 Conference, Madison, WI, 6 pages.

"Steam", Valve Corporation, retrieved from http://web.archive.org/web/20080102155211/http://www.steampowered.com/v/index.php, Jan. 2, 2008, 1 page.

"Open Source Tripwire", SourceForge, Inc., retrieved from http://web.archive.org/web/20071011064609/http://sourceforge.net/projects/tripwire/, Oct. 11, 2007, 1 page.

"Tripwire Enterprise/Open Source Tripwire Comparison", Tripwire, Inc., retrieved from http://web.archive.org/web/20071227174422/http://www.tripwire.com/products/enterprise/ost/#, Dec. 27, 2007, 4 pages.

* cited by examiner

1500

Appliance Creation Wizard: Appliance selection

| | Vendor | Appliance Name | Description | Base Price Plan |
|---|---|---|---|---|
| ☒ | VEND0 | APP001 | APP001 provides....... | Xxx $ / Month |
| ☐ | VEND0 | APP002 | APP002 provides....... | Xxx $ / Month |
| ☐ | VEND0 | APP003 | APP003 provides....... | Xxx $ / Month |
| ☐ | VEND1 | APP001 | APP001 provides....... | Xxx $ / Month |
| ☐ | VEND2 | APP001 | APP001 provides....... | Xxx $ / Month |
| ☐ | VEND3 | APP001 | APP001 provides....... | Xxx $ / Month |

1501, 1502, 1504, 1506, 1508

[Back] 1510  [Next] 1512  [Cancel] 1514

| | Option | Description | Price Plan |
|---|---|---|---|
| ☐ | OPT0 | Collocation | Xxx $ / Month |
| ☑ | OPT1 | Dedicated | Xxx $ / Month |
| ☐ | OPT2 | Managed | Xxx $ / Month |
| ☑ | OPT3 | 24/7 support | Xxx $ / Month |
| ☐ | OPT4 | other option | Xxx $ / Month |

Appliance Creation Wizard : Host Options 1702, 1704, 1706, 1708

TOTAL $ / Month

[Back] [Next] [Cancel]

| | Appliance Creation Wizard: Appliance Options | | |
|---|---|---|---|
| | Option (1802, 1804) | Description (1806) | Price Plan (1808) |
| ☐ | OPT0 | Backup connector | Xxx $ / Month |
| ☑ | OPT1 | DB | Xxx $ / Month |
| ☐ | OPT2 | other option | Xxx $ / Month |
| ☑ | OPT3 | other option | Xxx $ / Month |
| ☐ | OPT4 | other option | Xxx $ / Month |
| | | | TOTAL $ / Month |

[Back] [Next] [Cancel]

| Appliance Creation Wizard: Appliance Invoice | |
|---|---|
| | Cost: |
| Appliance APP01, Vendor VEND01 ←1902 1904→ | 1 $ |
| Options: | |
| OPT2 | 1 $ |
| OPT4 | 1 $ |
| Deployment: Hosted ←1904 | |
| Host : HOST2 | 1 $ |
| Options: | |
| OPT2 | 1 $ |
| OPT4 | 1 $ |
| Total: | 6 $ /month |

[ Back ] [ Next ] [ Cancel ]

Appliance Creation Wizard: Appliance Pre Configuration

Hostname: MYAPP  ← 2002

☑ Configuration option 1

☐ Configuration option 2

☑ Configuration option 3

............

[ Back ]  [ Next ]  [ Cancel ]

Appliance ManagerView License APP01 — 2202

Initiator: Vendorxyz
Receiver: Customer name
Manager: Vendorxyz

Scheme: <licensing scheme>
ProductID: App01
Purpose: <description summary>
Version: <app version>

Pricing: — 2204
    Cost: <agreed price>
    Schedule:<when can it be used>
    Expiry: <expiration date>
    Users: <number of users allowed>
    Instances:<number of instances allowed>

Terms — 2206
    Actions
    Constraints
    Exceptions

Warranty — 2208
    Duration
    Compensation

[Back] [Next]

FIG. 22

FLEXIBLE APPLIANCE HOSTING WITH COORDINATION OF DEPLOYMENT, LICENSING AND CONFIGURATION

TECHNICAL FIELD

This description relates to software appliances.

BACKGROUND

A software appliance generally may refer to one or more software applications that are integrated with a specific operating system and/or other software or hardware elements for subsequent installation and/or use in standard/commodity environments that may exist for potential purchasers/customers of the software application(s)/appliance. In this way, potential difficulties related to installation, maintenance, and use of the software application(s) may be minimized, and the software applications thus may more easily be provided to a large and varied customer base.

For example, a software vendor may develop and sell software applications using a Linux or Macintosh operating system, while a customer may operate in a Windows environment. Or, even if the vendor develops software applications in a common operating environment with potential customers, it still may occur that installation and configuration of such software applications may be expensive, time-consuming, and prone to error, particularly for large/complex applications.

In contrast, software appliances may be installed in a virtualized setting (e.g., in a virtual machine) or in a hardware setting (e.g., in a separate, pre-configured computing device) that is already configured to run the contained applications. Thus, providers of the software appliance may be better able to sell, install, maintain, and update the appliance and contained applications.

SUMMARY

According to one general aspect, a system may include a configuration manager configured to set operating parameters of one or more software appliances for use of the one or more software appliances within a system landscape, a licensing manager configured to maintain compliance of the one or more software appliances with license terms, and configured to communicate with the configuration manager to maintain compliance of the operating parameters, as set by the configuration manager, with the license terms, and a deployment manager configured to provide a user interface for administration of the one or more software appliances therewith, including deployment of the one or more software appliances within the system landscape, communicate with the licensing manager to maintain compliance of the administration of the one or more software appliances with the license terms, and communicate with the configuration manager to manage the deployment relative to the operating parameters.

According to another general aspect, operating parameters of one or more software appliances may be set at a configuration manager, for use of the one or more software appliances within a system landscape. Compliance of the one or more software appliances with license terms may be maintained at a license manager. Communications may be executed between the license manager and the configuration manager to maintain compliance of the operating parameters, as set by the configuration manager, with the license terms. A user interface may be provided for administration of the one or more software appliances therewith, the administration including deployment of the one or more software appliances, the license manager, the configuration manager, and a deployment manager within the system landscape. Communication may be executed between the license manager and the deployment manager to maintain compliance of the administration of the one or more software appliances with the license terms. Communication may be executed between the deployment manager and the configuration manager to manage the deployment relative to the operating parameters.

According to another general aspect, a computer program product may be tangibly embodied on a computer-readable medium and may include executable code that, when executed, is configured to cause a data processing apparatus to execute a hierarchical structure in which a configuration manager associated with operating parameters of one or more software appliances reports to a license manager configured to monitor and enforce license terms governing usage of the one or more software appliances, and in which the license manager is configured to report to a deployment manager configured to govern a deployment and operation of the one or more appliances, the deployment manager, the license manager, and the configuration manager, and output a graphical user interface using the deployment manager in which alerts are provided relative to each of the one or more appliances to provide information about potential license violations.

The details of one or more implementations are set forth in the accompanying drawings and the description below. Other features will be apparent from the description and drawings, and from the claims.

BRIEF DESCRIPTION OF THE DRAWINGS

FIG. 15 is an example screenshot of a graphical user interface of the system of FIG. 1 illustrating a first screen of an appliance creation wizard.

FIG. 17 is an example screenshot of a graphical user interface of the system of FIG. 1 illustrating a third screen of the appliance creation wizard of FIG. 15.

FIG. 18 is an example screenshot of a graphical user interface of the system of FIG. 1 illustrating a fourth screen of the appliance creation wizard of FIG. 15.

FIG. 19 is an example screenshot of a graphical user interface of the system of FIG. 1 illustrating a fifth screen of the appliance creation wizard of FIG. 15.

FIG. 20 is an example screenshot of a graphical user interface of the system of FIG. 1 illustrating a sixth screen of the appliance creation wizard of FIG. 15.

FIG. 22 is an example screenshot of a graphical user interface of the system of FIG. 1 illustrating a view of a license(s) of the appliance of FIG. 20.

DETAILED DESCRIPTION

Figure 1:
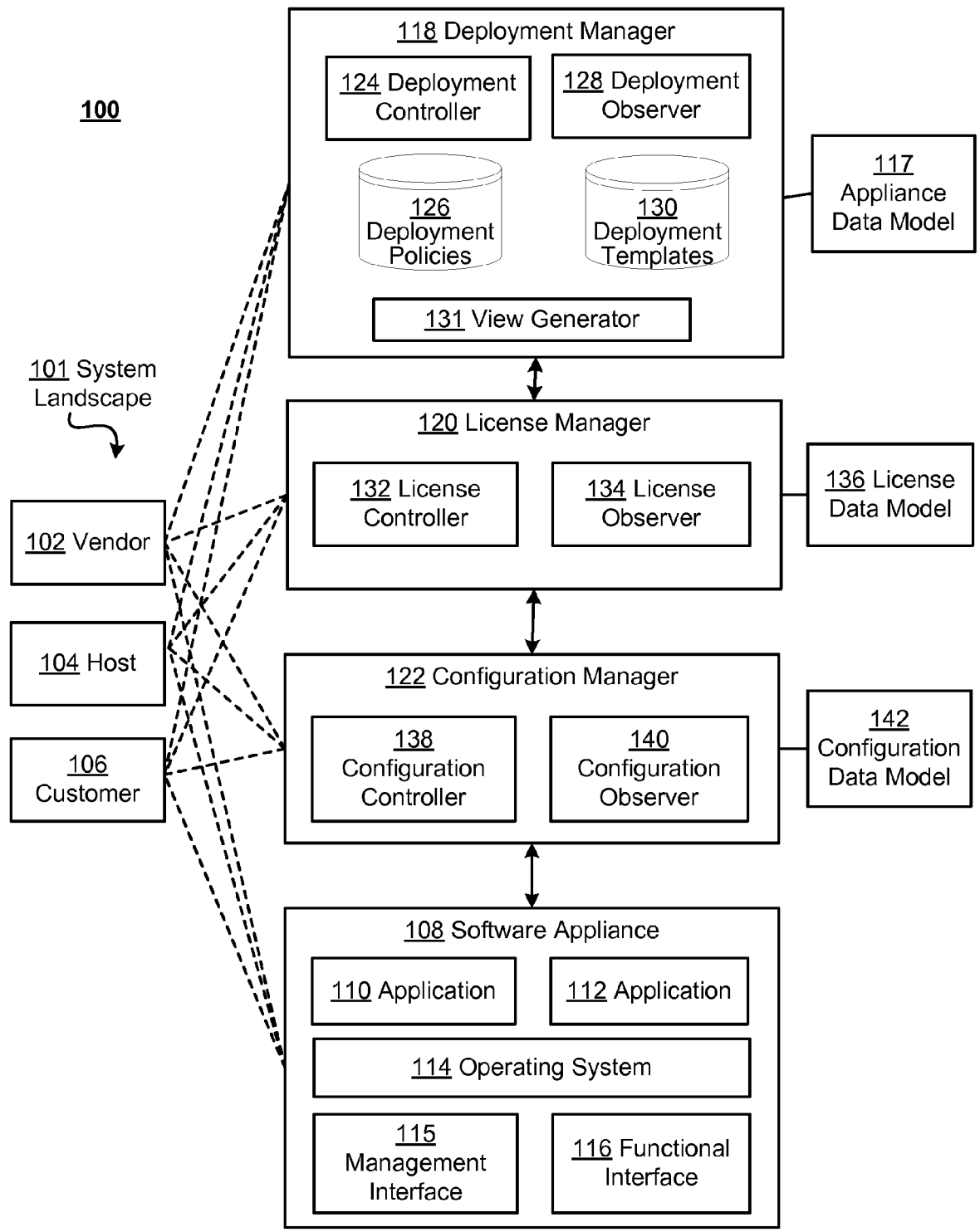
FIG. 1 is a block diagram of a system for flexible hosting of software appliances with coordination of deployment, licensing, and configuration.

FIG. 1 is a block diagram of a system 100 for flexible hosting of software appliances with coordination of deployment, licensing, and configuration thereof. In the example of FIG. 1, a system landscape 101 may include a vendor 102, a host 104, and a customer 106 (or some combination(s) thereof). Further in FIG. 1, an appliance 108 includes an application 110 and an application 112, along with an operating system 114. As referenced above, the vendor 102 may package the applications 110, 112 within the appliance 108, along with the operating system 114, and thereafter provide the appliance to the customer 106.

For example, the vendor 102 may provide the appliance 108 in a virtual machine or other virtualized setting, which may then execute on one or more computers of the customer 106. In other examples, the vendor 102 may provide the appliance 108 in a hardware environment, such as when the vendor sells specialized laptop, tablet, or other computer(s) to the customer 106. In these examples, the appliance 108 may execute at one or more customer sites, on one or more customer platforms. Customer personnel (e.g., information technology (IT) administrators) may be responsible for some or all of the duties associated with installing, using, and maintaining the appliance 108, and/or may share or delegate some or all such duties to personnel at the vendor 102 and/or at the host 104, using the system 100 and as described in more detail, herein.

It also may occur that the vendor 102 and/or the host 104 may develop the applications 110, 112 and then host the appliance 108, for use by the customer 106. Such appliance hosting in this context generally refers to the provision of physical machinery for execution of the self-contained executable(s) of the appliance 108.

For example, the vendor 102 may be in the business of developing, testing, marketing, and selling software applications, such as the applications 110, 112. Meanwhile, the host 104 may or may not develop particular software applications, but may be in the business of providing physical space, computing resources, and IT support personnel for use by the customer 106.

For example, the customer 106 may represent a small company in the business of selling various products, and may not wish to maintain extensive computing resources, nor to employ IT personnel. In this example, and assuming that the customer has need of the applications 110, 112, the host 104 may offer to store hardware (e.g., a server computer accessible by the customer 106 over a network) and to provide access to internal IT support staff, to thereby provide the customer with the software appliance 108 and other resources, e.g., over a public or private network, without requiring the customer to maintain corresponding hardware or employees.

The host 104 also may offer its own software products. For example, the vendor 102 may produce the application 110, while the host 104 may provide the application 112 and package both applications 110, 112 within the appliance 108. Thus, the host 104 may simply be a host for the software appliance 108, or may represent a vendor in its own right, as well. Conversely, as referenced above, the vendor 102 may operate as a host for the software appliance 108, and the customer 106 also may act as its own host. Examples of these and other deployment options for the appliance 108 are discussed herein, e.g., with respect to FIGS. 3 and 8.

In FIG. 1, as referenced above, the appliance 108 is intended to represent, generically, virtually any type of appliance. It will be appreciated that the operating system 114 may or may not be packaged within the appliance, and is included in FIG. 1 as a representative example of the type of resources that may be bundled with the appliance 108. Other examples of appliance resources include a management interface 115 and a functional interface 116. As may be appreciated, and as discussed in more detail, below, the management interface 115 may allow for access to management functionalities of the application(s) or of the appliance as a whole, such as configuring the appliance 108 or updating a current version of the software. Meanwhile, the functional interface 116 may interact with other appliances/applications in order to provide a given functionality of one or both applications.

In FIG. 1, these and other characteristics of the software appliance 108 may be described and encapsulated within an appliance data model 117. As described in more detail, below, with respect to FIG. 5, such a data model allows for a common, complete, and consistent interpretation of information about the license(s), configuration(s), interfaces, and other characteristics of the appliance 108, across the system landscape 101 and even across a heterogeneous landscape of the customer 106.

As referenced above, and described in detail herein, a number of possibilities exist for how the appliance 108 may be distributed across, and used/maintained within, the system landscape 101. In FIG. 1, a deployment manager 118 may be configured to manage such deployments of the appliance 108. For example, the deployment manager 118 may be responsible for determining where the appliance 108 should be located/hosted, e.g., at the vendor 102, host 104, or customer 106, or, more specifically, at which of one or more of a plurality of sites of one or more of these entities the appliance 108 should be deployed.

Further in FIG. 1, a license manager 120 may be configured to determine, track, and maintain compliance with agreed terms of a license according to which the customer is provided access to, and/or use of, the appliance 108. For example, where the vendor provides the appliance 108 and enters into a license agreement with the customer 106, the license manager 120 may ensure that the terms of this license are met by both parties. This is in the interest of both the customer 106 and the vendor 102, as, for example, the vendor 12 would want to be assured of the profitability of their business model and protection of their intellectual property, while the customer 106 would want to ensure no violation on their part of any license agreements that may lead to extra costs, lawsuits, or other potential problems. The license manager 120 also may alert the customer 106 when one or more licenses will expire for critical components (so that appropriate action may be taken before such an expiration actually occurs), or when there is the possibility to get a better price for the appliance 108 (or component thereof). Other uses and advantages of the license manager 120, as well as detailed description of example operations of the license manager 120, are provided in more detail, herein.

A configuration manager 122 may be configured to allow the customer 106 to set operating parameters associated with the appliance 108, e.g., either during start-up operations or during runtime. Such operational parameters ay include, for example, reference addresses, paths, thresholds, authorizations, naming, events, groups, roles and other context information. Thus, the configuration manager 12 allows the setting of operational parameters that enable the appliance to satisfy constraints specified by the operator (e.g., an IT administrator at one or more of the sites 102, 104, 106).

As described in detail herein, then, the system 100 of FIG. 1 provides a way to switch between appliance hosting options dynamically, and provides for the coordination of licensing and configuration management. Such techniques thereby provide a way to increase a profitability of the vendor 102 and the host 104 in providing the appliance 108, and provides for flexible deployment solutions in which the appliance 108 may be deployed so as to take best advantage of current staffing and other resource levels of the customer 106, as well as to adapt easily over time as these staffing/resource levels change. Even in the context of such flexible deployments, the system of FIG. 1 ensures that license term are not violated, and that configuration of operating parameters remains consistent both with the license terms and with a current deployment scenario.

One scenario or setting in which the system 100 may be advantageously deployed relates to what is known as the independent software vendor (ISV) consumption problem. This refers to situations in which, for example, the vendor 102 provides software, such as business software, and where other vendors may wish to customize, re-package, and re-sell the software of the vendor 102. Such a scenario may be beneficial to the vendor 102 (allowing their software to reach a wider customer base, for example, without having to develop the associated software), to the secondary vendor (allowing them to leverage the software of the vendor 102), and to the customer 106 (allowing the customer to have access to a customized/packaged solution that may otherwise be too expensive for the customer to purchase and use). For example, the vendor 102 may provide the application 110 as an inventory management system, while the host 104 may act as the second vendor who provides the application 112 as a billing system that the customer 106 may wish to use in conjunction with the inventory control system 110. In this way, again, the customer 106 is provided with a complete solution that may not be adequately provided individually by either of the vendor 102 or the host 104.

Despite these advantages, the described situation may be problematic in practice. For example, it may be difficult to maintain the compositions of licenses that result from the combination of applications from different vendors. Similarly, without proper coordination, it may occur that altering a configuration (e.g., operating parameter) of one vendor's application may cause difficulties in the other vendor's application. Thus, the system of FIG. 1 provides a strategy by which a vendor(s) may allow independent software vendors to customize, re-package and resell vendor solutions without infringing on intellectual property rights of the vendor. As referenced, the system 100 also provides for management of compositions of licenses and configuration settings, such that there are minimal conflicts, no violations of legal obligations by customers or vendors, and minimal complexity for system users and administrators in managing the described situations and similar settings.

Thus, the system of FIG. 1 may provide the advantages of traditional software appliance solutions, which may occur, for example, improved resource utilization (since appliances represent self-contained, preconfigured solutions that have more predictable resource requirements), a level of flexibility, adaptability and agility (since it is possible to move the hosting location of the appliance, as well as create multiple instances depending on frequency or load of usage of the appliance), and reduced TCO (Total Cost of Ownership) (since customers may choose to own appliances without having to own the associated configuration, and since customers may choose different types of licenses and assemblies for the particular selected appliance(s), according to the customer's requirements and length of time that the functionalities of the appliance will be needed).

In addition, as described herein, the system 100 provides a number of additional advantages. For example, the system 100 provides for the possibility to alter the distribution of responsibilities for hosting, configuration and licensing in the described distributed management infrastructure. As another example, the system 100 provides for the possibility for a customer to select between deployment hosting options according to their selected business model that best supports their current budget, spatial capacity, processing capacity, available personnel, production demand, conditions and environment. In the latter example, as the above distributions in responsibility and deployment are changed throughout the lifetime of one or more appliances, there may be different requirements on how the technical components that manage configuration and licensing need to be interconnected and operated. Thus, the system 100 ensures that flexible appliance deployment does not compromise correct enforcement of licensing and configuration parameters, while the mechanisms for licensing and configuration management do not hinder the attainment of flexible deployment.

In the example of FIG. 1, the deployment manager 118 includes a deployment controller 124 that may be configured to, for example, implement a set of deployment policies 126 associated with delivering an installer and data associated with an appliance to its host locations, running the installation process, and making the functional and management interfaces 115, 116 accessible. These actions may be implemented based on data detected from a deployment observer 128, which may monitor, for example, any of the license manager 120, the configuration manager 122, and/or the appliance 108.

Later in a deployment lifecycle, it may occur that one or more appliances may need to be migrated to another host location, which also may be implemented by the deployment controller 124, perhaps using deployment templates 130, as described below. Deployment may therefore have a lifecycle of [deliver→install→available□migrate→end]

As referenced above, deployment templates 130 may provide a guideline for making deployment decisions regarding the appliance 108 or other appliances, such as which entity 102, 104, 106 will host which manager(s) 118, 120, 122 and which entity 102, 104, 106 will host the appliance 108.

Deployment templates 130 may thus allow for the making of high level decisions about how to go about redistributing, reconfiguring and re-licensing the appliance 108 (and its component applications), and thereby simplify deployment policies and decision logic during runtime of an appliance. Examples of deployment templates 130 are provided below with respect to FIG. 8, and more detailed examples and description of implementations of the deployment manager 118 are provided below with respect to FIG. 9.

Finally with respect to the deployment manager 118 in FIG. 1, a view generator 131 may be included which is configured to generate a graphical user interface (GUI) for use by an administrator at one or more of the sites/entities 102, 104, 106 to manage various aspects of the system 100. For example, such a GUI may allow administrators to view available appliances, or create and deploy new appliances. The GUI also may be used to view existing license terms, or to provide a warning or other indicator when attention is needed regarding a license, such as when unlicensed users are using the appliance 108, or when a license is about to expire. The GUI also may be used to set operating parameters of the appliance 108, using the configuration manager 122. Examples of the GUI are provided below with respect to FIGS. 13-22.

The license manager 120 may include a license controller 132 and a license observer 134. The license controller 132 may be used, for example, to ensure compliance with a license currently in place, e.g., between the vendor 102 and the customer 106, where the license terms may be encapsulated in a license data model 136 that provides such license terms with a common format to other license documents. The license observer 134 may be configured to monitor the appliance 108 and/or the configuration manager 122, to thereby provide necessary information to the license controller 132 to ensure license compliance and to take appropriate action in case of potential noncompliance. For example, if the license observer 134 detects that a change in operational parameters is made at the configuration manager 122 (e.g., appliance access is given to a user having a certain role) that may violate a license term, then the license controller 132 may communicate with the deployment manager 118 so that the view generator 131 may output a warning on the GUI (e.g., as referenced in FIG. 13). An example of the license data model 136 is provided below with respect to FIG. 6, while additional illustration and discussion of the license manager 120 is provided with respect to FIG. 10.

Analogously to the deployment manager 118 and the license manager 120, the configuration manager 122 may include a configuration controller 138 and a configuration observer 140. As referenced above, the configuration controller 138 may provide for a setting of operational parameters of the appliance 108, such as which user roles at the customer 106 may be associated with using the appliance 108, or what level and type of computer resources should be devoted to running the appliance 108 (for example, what percentage of memory or other resources of an underlying hardware platform should be devoted to a virtualized machine executing the appliance 108). Operations of the configuration controller 138 may be based at least in part on a configuration data model 142, which may provide, e.g., current or desired operating parameters for the appliance 108. Further, the configuration observer 140 may monitor the appliance 108 and provide the results to the configuration controller 138, for use in conjunction with the configuration data model 142) in setting and managing the operating parameters of the system 100. The configuration data model 142 is discussed and illustrated with respect to FIG. 7, while the configuration manager 124 is discussed below in more detail with respect to FIG. 11.

Figure 9:
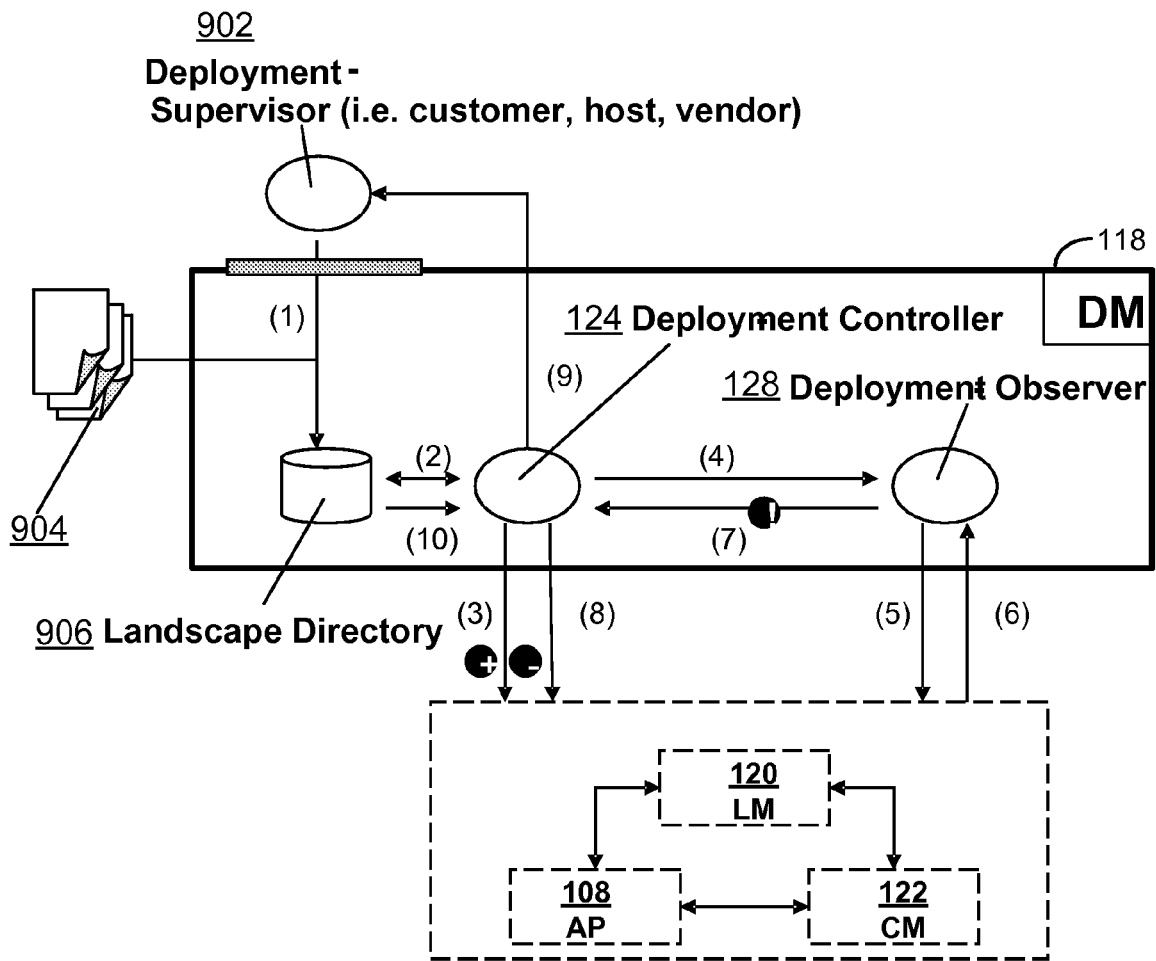
FIG. 9 is a block diagram of a deployment manager of FIG. 1.
Figure 10:
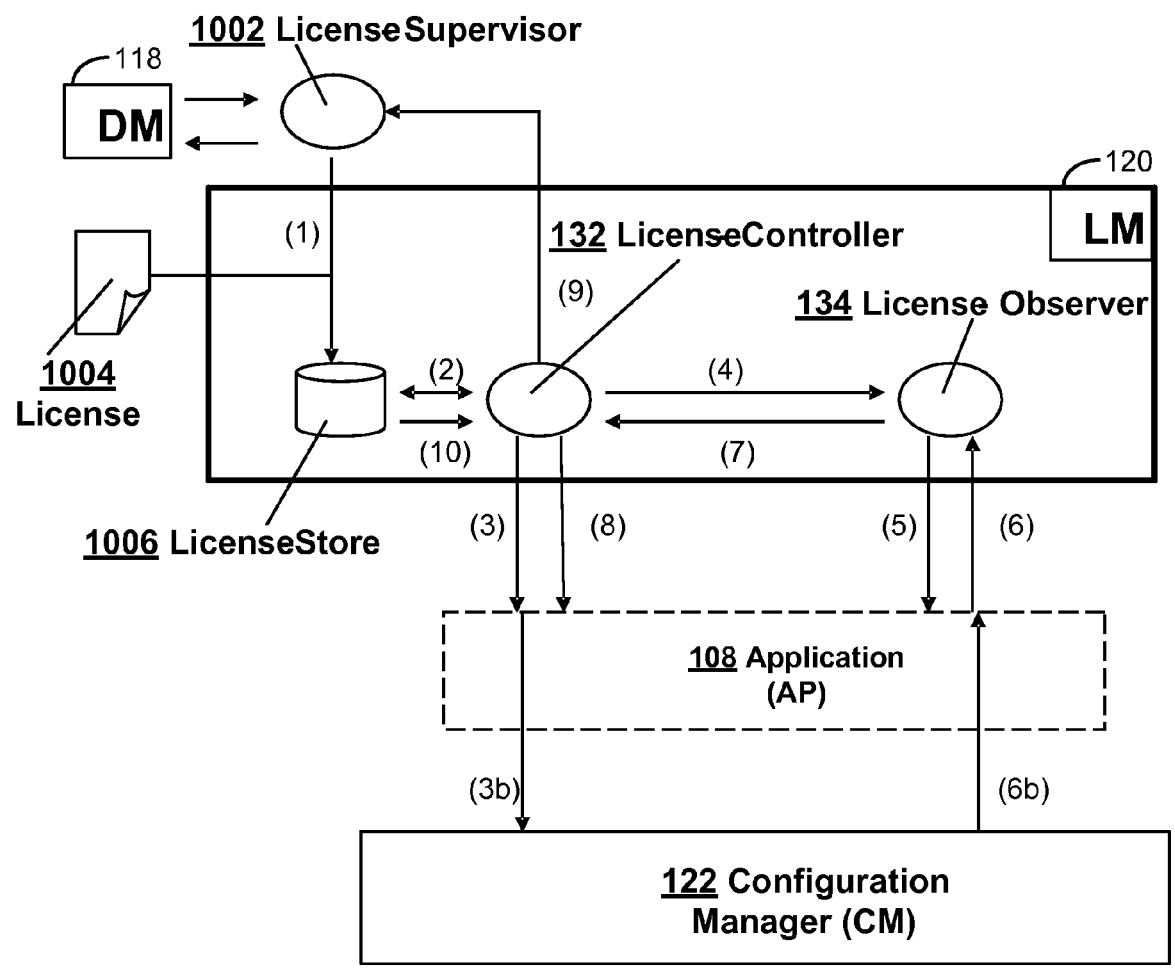
FIG. 10 is a block diagram of a license manager of FIG. 1.
Figure 11:
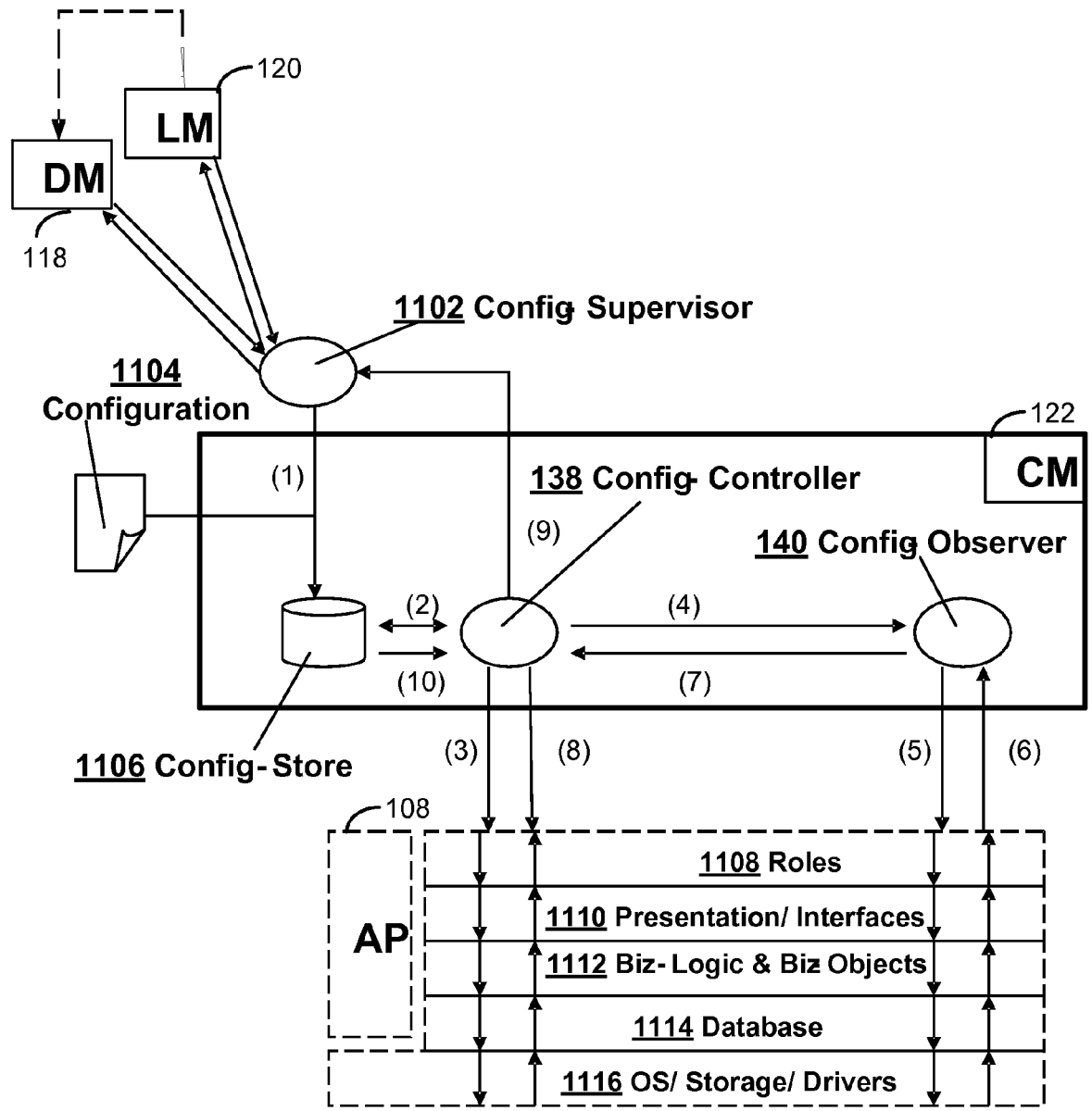
FIG. 11 is a block diagram of a configuration manager of FIG. 1.

From the above description, and from the following description of FIGS. 9-11, it may be appreciated that the system 100 includes a collection of management entities, which may include controllers 124, 132, 138 and observers 128, 134, 140. The managers 118, 120, 122 then represent three management concerns that are hierarchically arranged, where the deployment manager 118 coordinates the license manager 120 and the configuration manager 122. Each observer 128, 134, 140 may be considered to have an observed target, where the target varies depending on the type of manager; e.g., a target of the configuration manager 122 may include the appliance 108, while targets of the deployment manager 118 may include the license manager 120, the configuration manager 122, and the appliance 108. Observers 128, 134, 140 may be capable of retrieving key data or signals from their designated targets, while controllers 124, 132, 138 may be provided with access to certain operational interfaces of the target(s) (e.g., the management or functional interfaces 115, 116 of the appliance). Controllers 124, 132, 138 also may be registered with one or more observers to receive notifications on certain observations being made of their respective control targets.

The management paradigm of the system 100 also may be considered to include supervisors, which may represent humans or machines that provide directives concerning what is to be observed and what is to be controlled in the system 100. In the hierarchical management model described above, the deployment manager 118 is the supervisor of the licensing manager 120, and the licensing manager 120 the supervisor of the configuration manager 122, respectively. A human system or domain administrator may then be the supervisor of the deployment manager 118. Additional description of the described management paradigm of FIG. 1 is provided below, e.g., with respect to FIGS. 9-11.

The system of FIG. 1 may thus be used for remote deployment and management of appliances, such as the appliance 108, across the system landscape 101. In this sense, the system landscape 101 should be understood to include any of the described components of FIG. 1 that are unique within a namespace defined relative to the customer 106, even though, as described, some of the components may be located at a site(s) of the vendor 102 or the host 104, and even though otherwise same or similar components also may be located at one of the vendor 102 or the host 104 for other customers. In this way, the system 100 provides software that may be used as an additional layer above deployed appliances, in order to manage concerns regarding the appliances including deploying, installing, billing, licensing, configuring, migrating, creating, updating, maintaining, or otherwise using the appliances, even when the appliances are provided by multiple vendors and/or need to be hosted at different and changing entities, sites and/or platforms.

Figure 2:
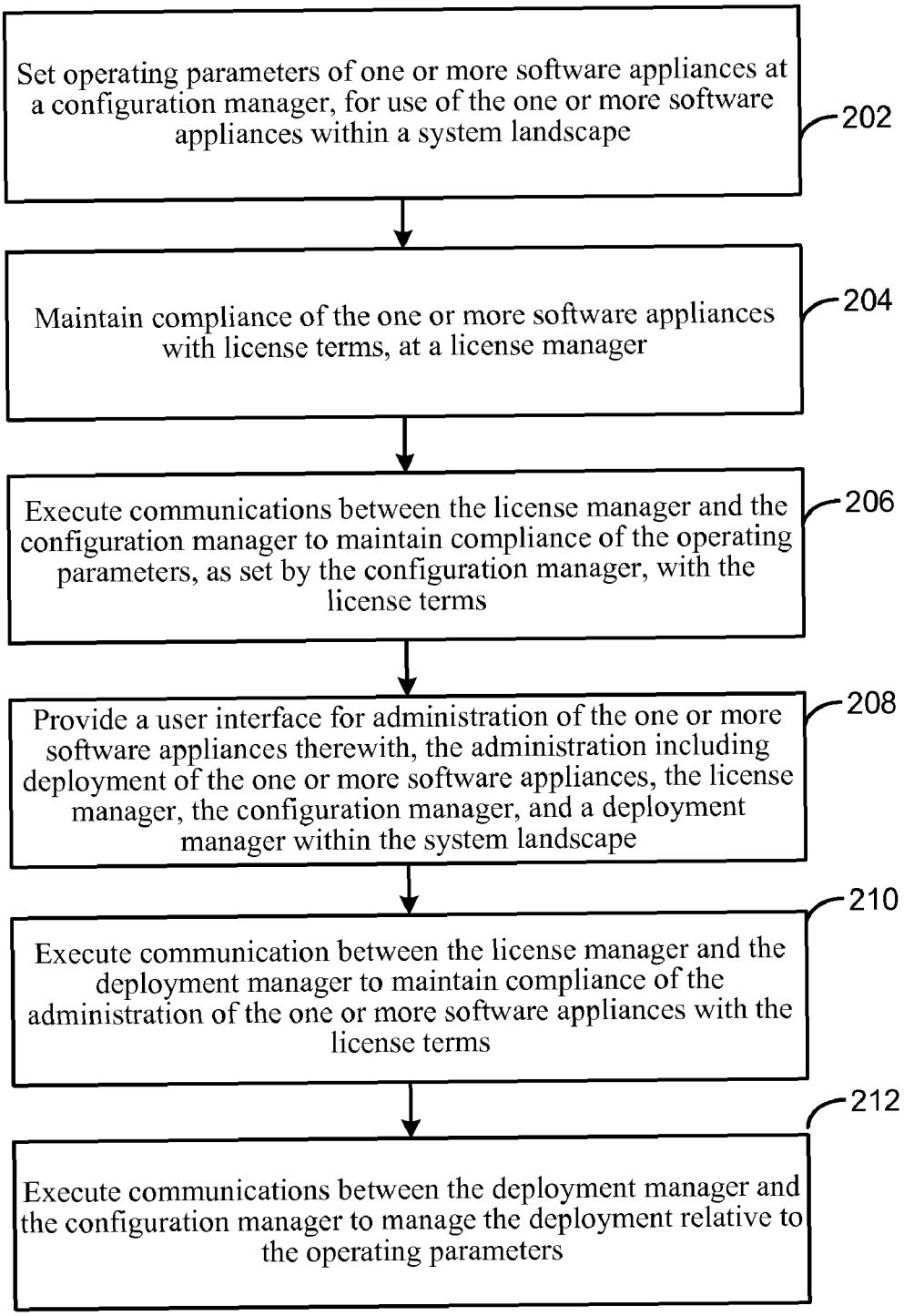
FIG. 2 is a flowchart illustrating example operations of the system of FIG. 1.

FIG. 2 is a flowchart 200 illustrating example operations of the system of FIG. 1. In the example of FIG. 2, operating parameters of one or more software appliances may be set at a configuration manager, for use of the one or more software appliances within a system landscape (202). For example, the appliance 108 may have been already deployed and/or installed at one or more sites of the customer 106, host 104, or vendor 102, so that the configuration manager 122 may be used to set operating parameters of a computing device on which the appliance 108 is to be hosted, such as which users or roles may use the appliance, or how underlying hardware resources of the computing device should be allocated to run the appliance.

Compliance of the one or more software appliances with license terms may be maintained at a license manager (204). For example, the license manager 120 of FIG. 1 may be configured to input the license data model 136 and to then use the license observer 134 to monitor and obtain current information or statistics about usage of the configured appliance 108, such as how many users are currently using the appliance 108, or how long the existing license has been in effect, so that the license controller 132 may then make a determination as to whether, for example, the license terms have been violated by virtue of too many users using the appliance 108 simultaneously, or by virtue of passage of a pre-determined time before license renewal is required.

Communications may be executed between the license manager and the configuration manager to maintain compliance of the operating parameters, as set by the configuration manager, with the license terms (206). For example, the license manager 120 may exchange messages with the configuration manager 122 in order that the license observer 134 may again obtain relevant operating parameters that may potentially affect license compliance, and so that the license controller 132 may then make a determination as to whether such a violation is imminent or has already occurred.

A user interface may be provided for administration of the one or more software appliances therewith, the administration including deployment of the one or more software appliances, the license manager, the configuration manager, and a deployment manager within the system landscape (208). For example, the view generator 131 may be configured to generate a graphical user interface (e.g., as shown in FIGS. 13-22) that provides for the administration of the software appliance 108, including deploying the appliance 108 within the system landscape 101 (e.g., to the host 104, or to the vendor 102), but also including deploying the managers 118, 120, 122 within the system landscape 101. For example, in the latter case, it may occur that the appliance is deployed to the host 104, while the license manager 120 and the configuration manager 122 are deployed at the customer 106, and three instances of the deployment manager 118 are deployed at each of the vendor 102, host 104, and the customer 106 (see, e.g. deployment template 1 of FIG. 8).

Communication may be executed between the license manager and the deployment manager to maintain compliance of the administration of the one or more software appliances with the license terms (210). For example, the deployment observer 128 may exchange messages with the license controller 132, so that, for example, the view generator 131 may be made aware of a potential license violation and then output a corresponding warning on the produced graphical user interface.

Communications may be executed between the deployment manager and the configuration manager to manage the deployment relative to the operating parameters (212). For example, the deployment observer 128 may exchange messages with the configuration controller 138, so that, for example, the deployment controller 124 may determine that current operating parameters at a customer site indicate that an appliance currently deployed at the customer site, such as the appliance 108, might be better deployed at a third party host, such as the host 106, or that current operating parameters indicate that the license manager 120 and the configuration manager 122 (which may be currently hosted a the customer 106) might be better hosted at the host 104.

Figure 3:
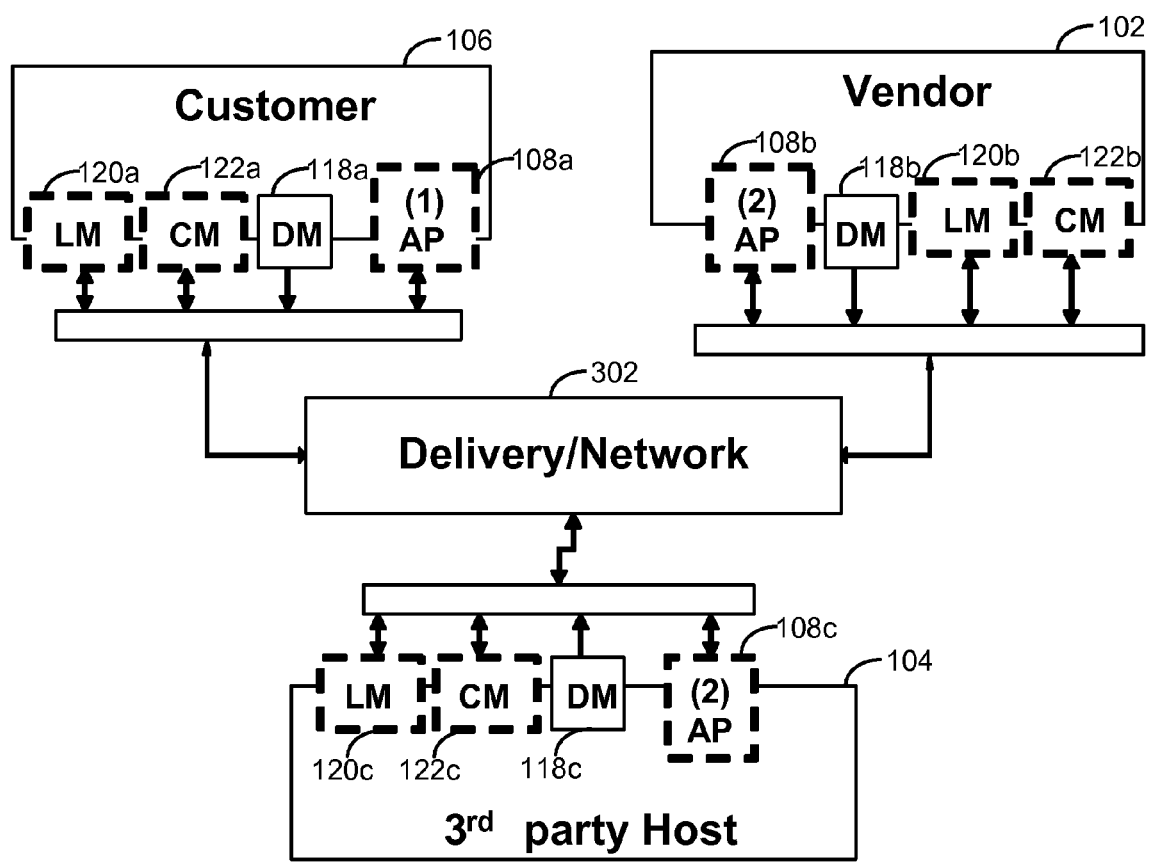
FIG. 3 is a block diagram of example system landscapes used by the system of FIG. 1.

FIG. 3 is a block diagram 300 of example system landscapes used by the system of FIG. 1, in which, as described herein, a distributed management infrastructure is created for the purposes of supporting the appliance(s) 108. FIG. 3 illustrates that the vendor 102, host 104, and customer 106 may be connected by a delivery channel, e.g. network, 302, such as the internet or other public or private network. The delivery channel/network 302 also may be used to execute communication between the components of the system 100, as described herein, such as licensing and configuration information.

In the example of FIG. 3, the deployment managers 118a, 118b, 118c are each deployed at one of the vendor 102, host 104, and customer 106, as indicated by the solid line representation of that component(s). Meanwhile, the license managers 120a, 120b, 120c and the configuration managers 122a, 122b, 122c are illustrated in dashed line, indicating that these components may be deployed at some or all of the sites of the vendor 102, the host 104, and the customer 106. Somewhat similarly, the appliance AP1 108a is illustrated at the customer 106, while the appliance AP2 108b, 108c is illustrated at one or both of the vendor 102 and the host 104.

By splitting concerns of hosting, licensing, and configuring into separate system management concerns, the techniques and responsibilities can be flexibly pre-determined before runtime, or altered during the operation of the appliance(s) 108. Nonetheless, the deployment manager 118a, 118b, 118c may be implemented as a single component at each location that is in charge of coordinating the selected set up for the appliance's management infrastructure, and which takes on a supervisory support role in the management infrastructure.

Figure 4:
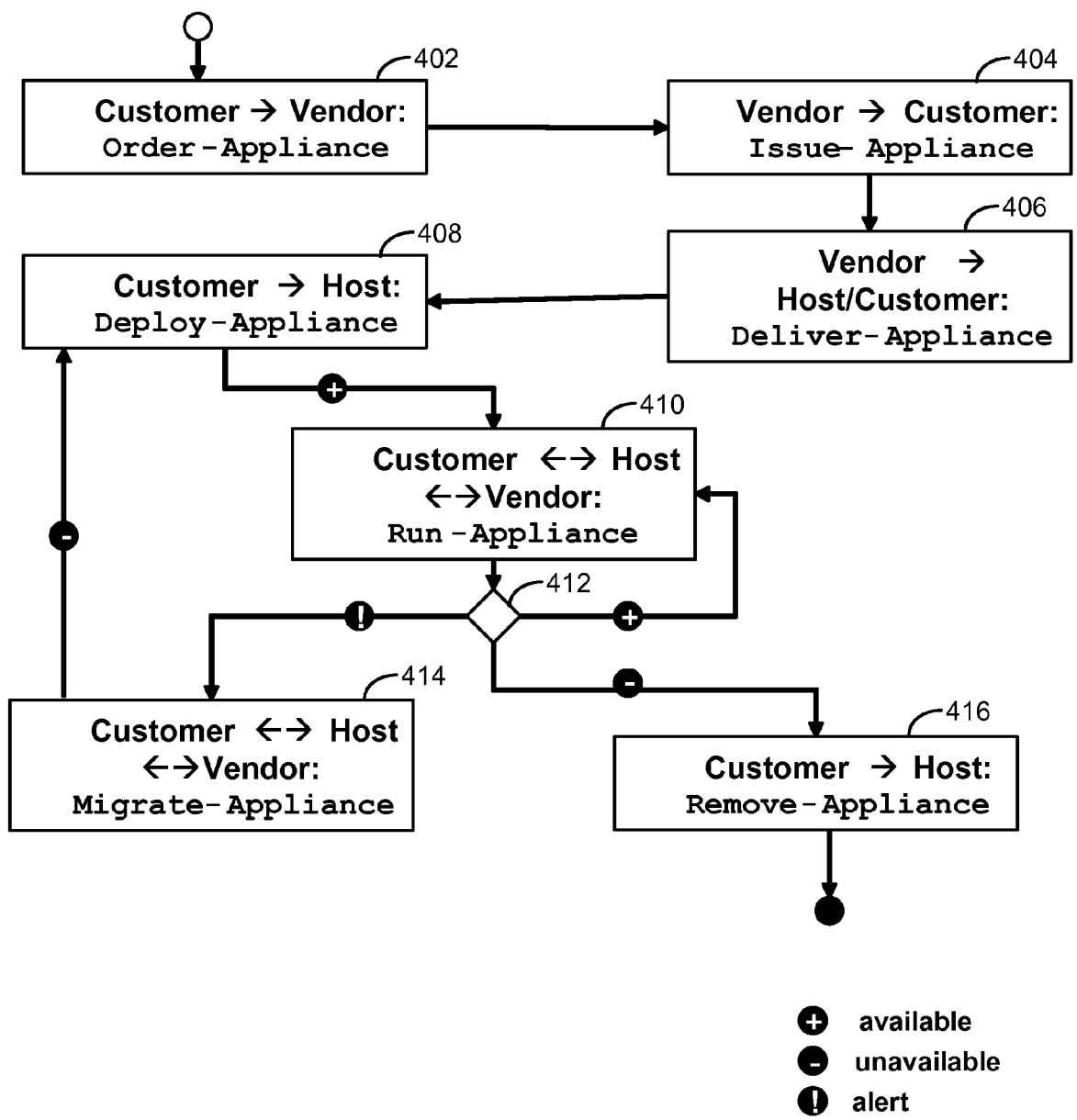
FIG. 4 is a flowchart illustrating example lifecycles of a software appliance used in the system of FIG. 1.

FIG. 4 is a flowchart 400 illustrating example lifecycles of a software appliance used in the system of FIG. 1. In this context, a lifecycle, or management lifecycle, of an appliance describes its handling from the point of ordering to the point of no longer being required and removed from its execution. As represented in FIG. 4, there are seven steps in the management lifecycle, with steps (408, 410, 414, 416)) being the phases where flexible deployment changes occur.

As a preliminary matter, it will be appreciated that certain levels of trust and security exist between the actors and of their interactions, respectively. In order to represent the security assumptions in the lifecycle, the following representation of cryptographic primitives are used: (1) Encrypt{message, key(A,B)}: this indicates that a message exchanged between an initiator A and a receiver B is encrypted with a key shared between the two parties, such that A trusts B and B trusts A; (2) Decrypt{message, key(A,B)}: similar to above, as a result of a shared secret key between the initiator and the receiver, any message that is encrypted with the shared key can be decrypted by either A or B, with the assumption that they have agreed on the cryptographic scheme used; (3) Sign{message, key(A|B)}: this implies that a message is signed by A's private key with the knowledge that B has possession of A's corresponding public key; and (4) Validate {message, key (A|B)}: this implies that a message signed by A's private key is validated by B's copy of A's public key.

In FIG. 4, then, the appliance may first be ordered (402). For example, the customer 106 may use a catalogue to search for vendors, where the catalogue may be as simple as using a search engine. Once a vendor has been found and selected, there may be some period of price negotiation that are not described here. The end result is the customer sending a purchase-order to the vendor, including, e.g., the agreed specification of the appliance, the billing details and the delivery details. Note that if the customer is getting a renewal of an appliance, this would be flagged as a renewal-order instead. It is assumed that this is sent over a trusted and secure channel and that a key (C, V) has been previously established. Operation 402 may thus be conducted using Code Section 1:

Code Section 1

```
Order-Appliance(Purchase-Order){
    C → V: Encrypt{
        Sign{
            Purchase-Order(
                Appliance-Requirements{...},
                Billing-Name(C),
                Billing-Address(C),
                Payment-Method(C),
                Delivery-Address(C)
            ),
            key(C|V);
        };
        key(C,V);
    };
}
```

At this stage, there may only be a basic configuration in place, and a licensing proposal, which may represent the first stage of a suitable licensing negotiation protocol.

The appliance may then be issued (404). Once the vendor agrees to the licensing terms, and packages and prepares the appliance, then the vendor 102 simply passes back the agreed appliance description to the customer 106, who, on assessing the description, passes back a listing of host delivery points (HDPs) to the vendor 102, e.g., using Code Section 2:

Code Section 2

```
i. V → C: Encrypt{
    Sign{
        Appliance-Description{...}
    ),
    key(V|C);
    };
    key(C,V);
};
ii. C → V: Encrypt{
    Sign{
        Host-delivery-points{...},
        key(C|V);
    };
    key(C,V);
};
```

A host delivery point (HDP) in this context may refer to a specification of the deployment manager (DM) end point references (EPRs) where appliances (or portions thereof) are to be deployed, and may include the necessary credentials issued to the vendor 102 in order to allow the vendor 102 to submit the appliance directly to the host 104. The customer 106 in this example acts as the trust anchor between the vendor 102 and the host 104, where, in one case, the host 104 could be the customer 106. An HDP would therefore have the following specification of Code Section 3, where a credential is just an attribute that can be used as an extension in an identity certificate:

Code Section 3

```
HDP {
    Appliance-ID:Container-ID;
    Host-DM-URL = \\{ip-address}\dm?deploy;
    Sign {
        Vendor-Credential (Vendor-ID,
            Appliance-ID:Container-
ID,uses=n,expiry=dd/mm/yy);
        key(C|V);
```

Code Section 3 -continued

```
    }
    Sign {
        Host-Credential (Host-ID,
            Host-DM-URL,uses=n,expiry=dd/mm/yy);
        Key(C|H);
    }
}
```

The vendor 102 would then bind the vendor-credential to its identity certificate and use this as its means of identification when contacting the host 104.

The appliance may then be delivered (406). That is, once the vendor 102 has prepared the appliance for delivery (including the agreed pre-configuration, packaging and licensing), the vendor 102 may deliver the appliance 108 to the HDP indicated by the customer 106. As described, the customer 106 might send several HDPs to the vendor 102, since different appliances or portions thereof may be deployed to different, distributed locations, using Code Section 4:

Code Section 4

```
i. V → H: Encrypt{
    Sign{
        Appliance(
            Appliance-Description{...},
            Appliance.pkg
        ),
        key(V|H);
    };
    key(V,H);
};
ii. H → C: Encrypt{
    Sign{
        Hosted-Appliance
        (
            Appliance-Description{...},
            \\{ip-address}\ap?launch
        ),
        key(H|C);
    };
    key(H,C);
};
```

In Code Section 4, step (i) shows the vendor 102 delivering the appliance 108 to the host 104, where the file Appliance.pkg is included. The .pkg extension supersedes other archival mechanisms including, for example, war, jar, zip and gz, all of which could be used for the actual archival of the binary. Even if the delivery is physical, i.e. the vendor 102 delivers a pre-configured, physical machine to the customer 106, the software may remain optionally archived and cryptographically locked until opened with the corresponding key. Further in Code Section 4, step (ii) shows that on reception of the appliance 108, the host 104 may contact the customer 106 (i.e., the owner of the appliance 108) to notify of the arrival of the appliance 108. The notification may include the appliance description, so that the customer 106 knows which appliance has been deployed by the host 104, as well as a URL for the customer 106 to launch the hosted appliance 108.

Then, the appliance may be deployed (408). For example, although the appliance 108 is available at the host 104 in the described examples, the customer 106 may be able to launch and deploy whenever needed, as stipulated by the agreed terms in the license. The customer 106 may however choose to modify some of the configurations of the appliance-description.

```
                    Code Section 5
    i. C → H: \\{ip-address}\ap?launch
        Encrypt{
            Sign{Configuration[ ], key(C|H)};
                key(C,H);
        };
    ii. H → C: Encrypt{
            Sign{\\{ap-url}, key(C|H)};
                key(C,H);
        };
```

Once the host 104 receives the updated/refined configurations from the customer 106, the appliance description is modified accordingly and the appliance 108 may be run. The host 104 returns a unique URL for the appliance (e.g., \\{ap-url}). Each appliance portion (e.g., appliance containers and components, as described herein) also may have its own URL and IP addresses (and/or MAC addresses), according to the specification of the appliance 108. A VPN (Virtual Private Network) may be established between the customer 106 and the appliance 108 directly, to allow secure communication that is isolated from the other appliances and applications of the host 104.

The appliance may then be run (410). The customer 106 may then use the appliance 108 according to its functional interface 116, sending the appropriate data, as shown in Code Section 6:

```
                    Code Section 6
    C → AP: \\{ap-url}\service?
        Encrypt{Sign{data,key(C|AP)}key(C,AP);}
```

While running the appliance 108, there may be intermediate push or pull notifications sent to the respective controllers 124, 132, 138 through the appliance's management interface 115.

If determined necessary at a decision point (412), then the appliance may be migrated (414). For example, this phase in the lifecycle may occur when a current deployment condition is detected that triggers a suggested deployment template (SDT) of the deployment templates 130. Such SDT's may be obtained from policy decisions about deployment templates that are determined from the evaluation of the deployment policies 126 of the form: ON [condition] EXECUTE [DT] GIVEN [resolution-strategy]. The way in which the abstract [condition] is determined may be based on a the hierarchy of observers 128, 134, 140 that provide for evaluation of multiple simple observations to a single complex condition statement. If multiple DTs are selected, e.g. if there are policies that state the same conditions for at least two different DTs, a resolution-strategy may be invoked by the deployment controller 124 that returns only one DT. The resolution strategy may be as simple as placing a static hierarchy on the DTs, or as complex as using a dynamic prioritization with a utility function that dynamically ranks DTs over time.

The selection of a DT may result in the appliance 108 being shifted from its current location, or the licensing and configuration managers 120, 122 being reloaded with different configurations, licensing models and/or control points. In case of a transfer of the appliance 108 between two hosts H1 and H2, where H1 or H2 could in some situations be the customer C, the following interaction may occur, as shown in Code Section 7:

```
                    Code Section 7
    H1 → H2: Encrypt{
        Sign{
            Appliance(
                Appliance-Description{...},
                Appliance.pkg
            ),
            key(H1|H2);
        };
        key(H1,H2);
    };
```

Finally in the example of FIG. 4, the appliance may be removed (416). That is, once the appliance 108 is no longer required, or exceeds its license validity, it may be removed from (or disabled at) its current host with respect to the particular customer 106. There may be some deployment models where the appliance continues running as it is owned by the host, but its usage is reduced to only customers that remain valid. Thus, removal may be understood as an empty operation on an iteratively updated list of expired licenses without a "renewable" flag.

```
                    Code Section 8
    C → V: Encrypt{
        Sign{
            Removal {Appliance-Id}
        ),
            key(C|V);
        };
        key(C,V);
    };
```

Removing the appliance 108 may then have further termination actions that follow, such as completing payments, verifying licenses, and gathering logs.

Figure 5:
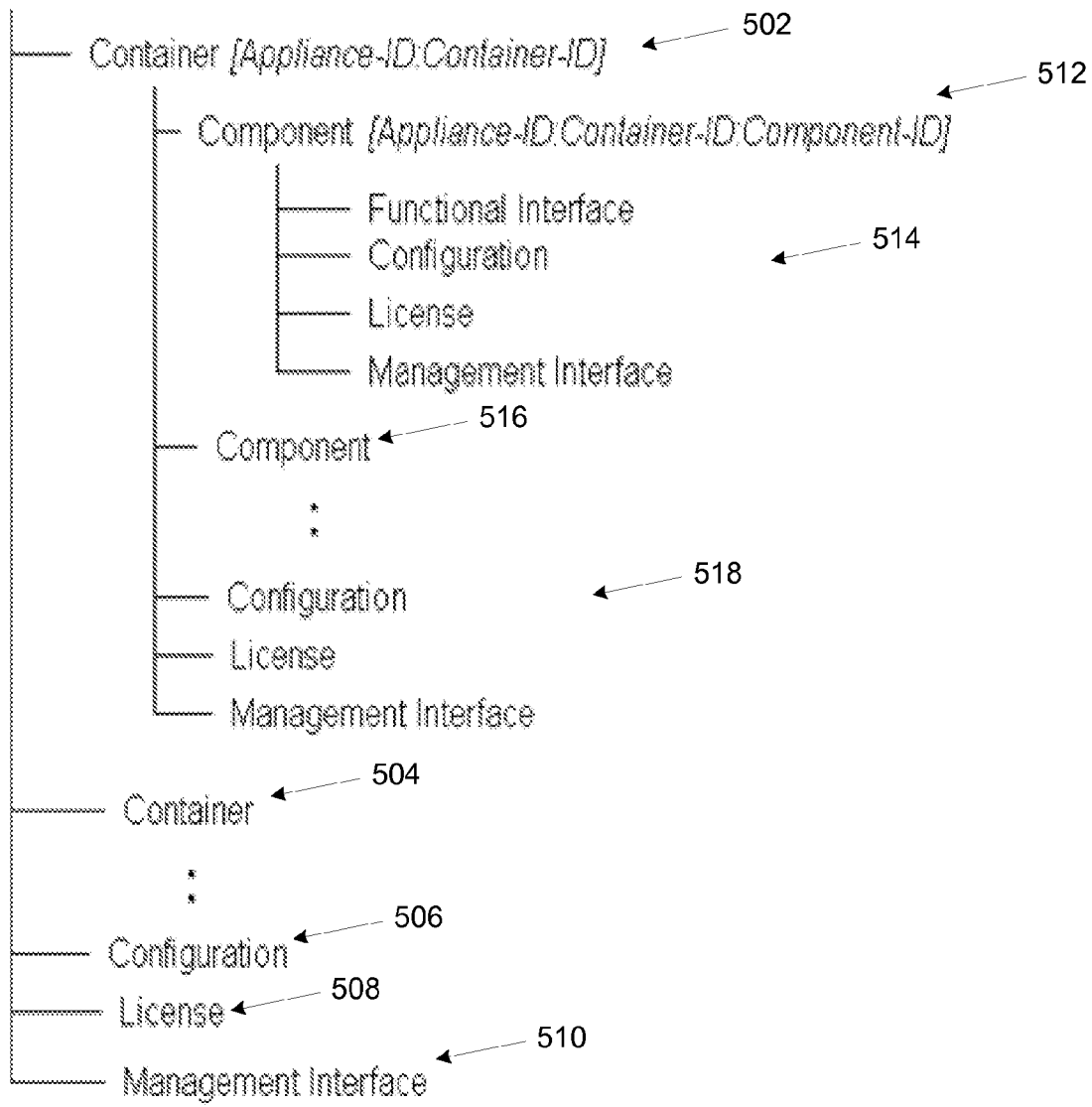
FIG. 5 is an example of an appliance data model used to characterize an appliance used in the system of FIG. 1.

FIG. 5 is an example of an appliance data model 500 used to characterize an appliance used in the system of FIG. 1. The appliance data model 500 includes containers 502, 504 that represent self-contained units associated with a particular software application or software function. For example, the appliance 108 may be a sales system appliance related to one o more software applications for supporting a sales operation. Then, the container 502 may represent a sales application or aspect as a shell for the appliance 108, where the container 504 may represent a credit check container/functionality. Other containers for such a sale system may include, for example, a container for logistics and tracking of inventory items.

The appliance data model may include configuration document(s) 506 according to a configuration data model (e.g., see FIG. 7), as well as a license document(s) 508 related to a license data model (e.g., see FIG. 6), and a management interface 510 describing the management interface 115 of the application 108.

Each container may include a component, as a functional unit that is delivered to the customer. For example, and continuing the above example of a sales system, the component 512 may relate to corporate sales, while the component 516 may relate to individual/retail sales, as shown with respect to the component 512, license documents, configuration documents, and functional/management interfaces may be included/referenced that are specific to the particular component.

As shown in FIG. 5, an appliance, such as the appliance 108, may have an appliance identifier (Appliance-ID) that is assumed to be unique within a given namespace (e.g., composed of a unification of the customer's and vendor's name) for the execution environment within which the customer 106, vendor 102, and host 104 are networked. This namespace may then be considered to be an identifier of the appliance domain. As appreciated from the above description, the functional and management interfaces describe how to interact with a component, container or appliance respectively, and, in the case of the management interface, the types of notifications that they will produce. Both interfaces may be used for monitoring and controlling the components, containers and appliances. In order to make a container unique it may be bound to the namespace of its appliance, while components are likewise bound to the namespace of their container. In some implementations, then, the same component functionality may appear in different containers, but with the potential for different licenses and/or configurations, and may be deployed at different locations, while still supporting the composite appliance functionality.

Figure 6:
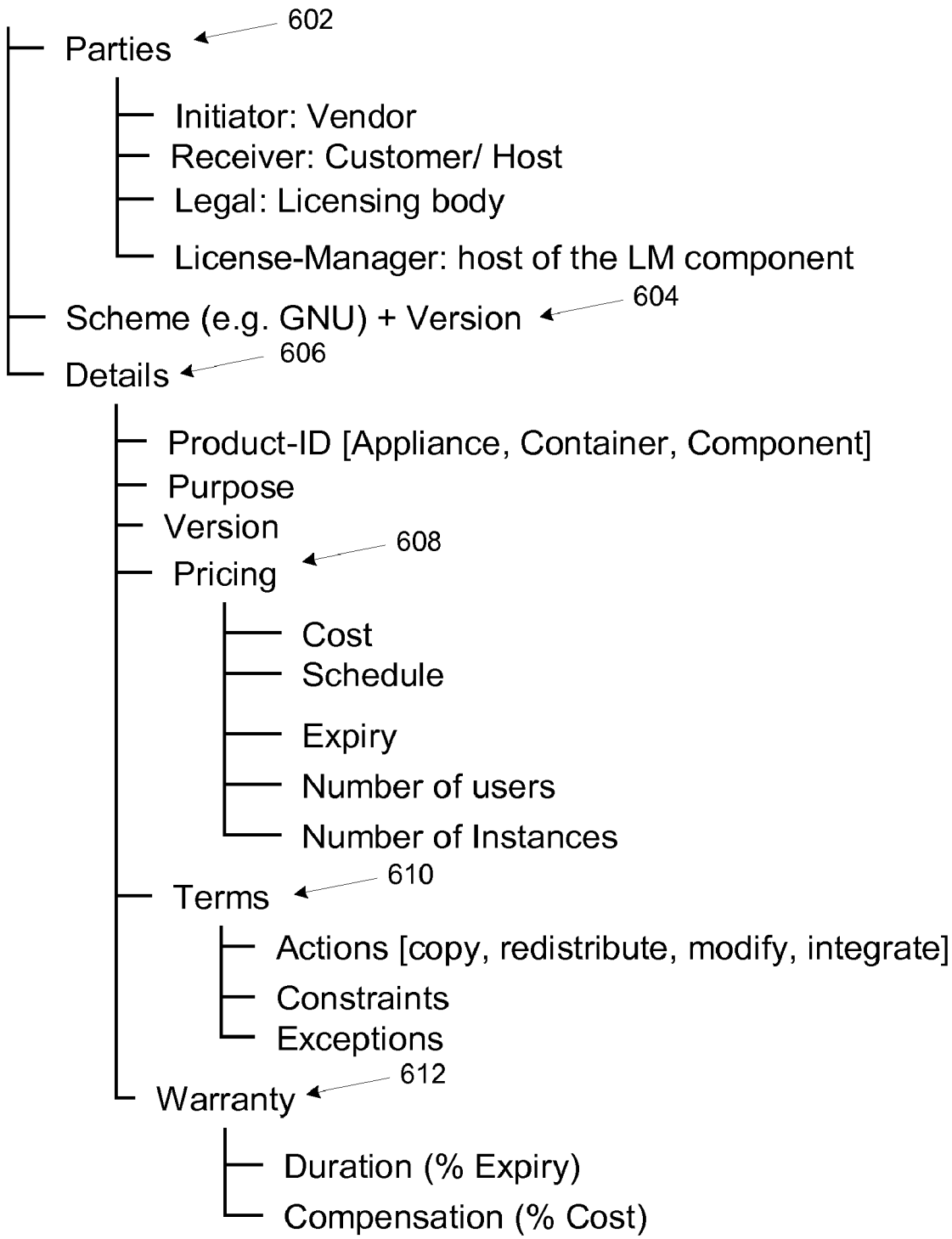
FIG. 6 is an example of a license data model used to characterize a license of the appliance used in the system of FIG. 1.

FIG. 6 is an example of a license data model 600 used to characterize a license of the appliance 108 used in the system of FIG. 1. The license data model 600 may include the parties 602 of the license, such as its initiator (the vendor 102), receiver (the customer 106 or the host 104) and, if general-purposed schemes 604 are being used (such as GNU) the legal licensing body involved. The license manager 120 (e.g., the physical host o the licensing manager 120) also may be included.

Details 606 may govern redistribution, copying, modification and number of users of the appliance or component/container in question. Specifically, the details 606 may includes a product ID, a purpose, and a version of the software. Pricing 608 may include a cost, schedule, expiration, (number of) uses, and (number of) instances that are governed/allowed. Terms 810 may include actions, constraints, and exceptions that are required/prohibited by the license, while warranty 612 may be included with respect to a length and extent of coverage. The data model 600 thus enhances the possibility and granularity for automated license monitoring and maintenance.

Figure 7:
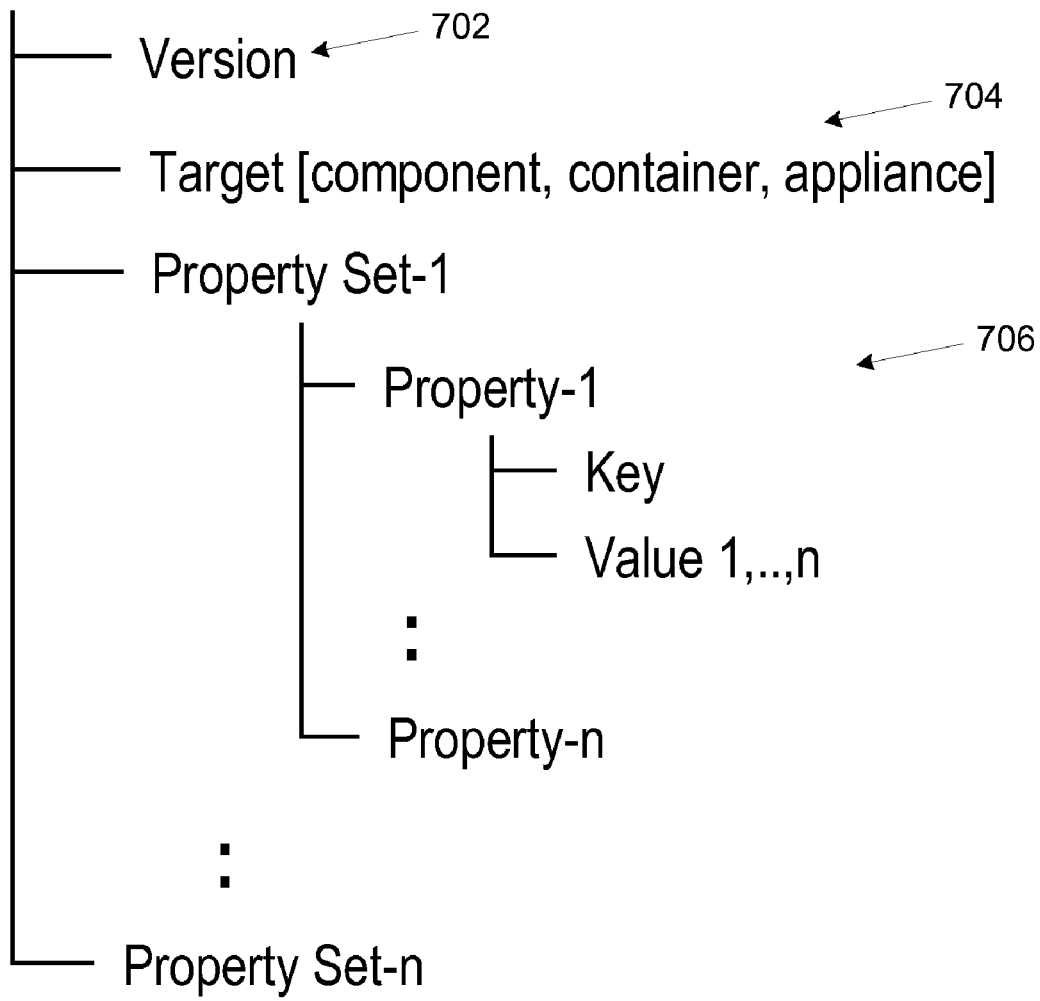
FIG. 7 is an example of a configuration data model used to characterize a configuration of the appliance used in the system of FIG. 1.

FIG. 7 is an example of a configuration data model 700 used to characterize a configuration of the appliance 108 used in the system of FIG. 1. The configuration data model 700 include version information 702, target information 704 (e.g., a component, container or appliance to be monitored by the configuration observer 140, as well as property sets 706 that specify a structure and value for operating parameters set by or monitored by the configuration manager 122. Property-sets 708 may thus include groupings of properties that refer to the same general property types e.g. network, GUI, database, or quality of service (QoS), etc.

In the above examples, it may occur that each appliance and container also may have master configuration and licensing documents, such that the license and configuration of the parent dominates that of the child. This allows even more flexibility in composing different components, since, for example, the customer 102 may agree to different licensing agreements with the vendor, and different instances of the same components or containers can have completely different configurations. Such composite licensing may provide for licensing that is finer grained, more flexible, and not fully restrictive. For example, the same web server appliance technology could be used as a company's website host, while another is used only internally as an intranet portal. Accordingly, because they have different access and load-balancing requirements, the vendor 102 might offer the customer 106 different licenses for these different distributions of the web server appliance. This would in turn alter the configuration of the web server appliance.

Figure 8:
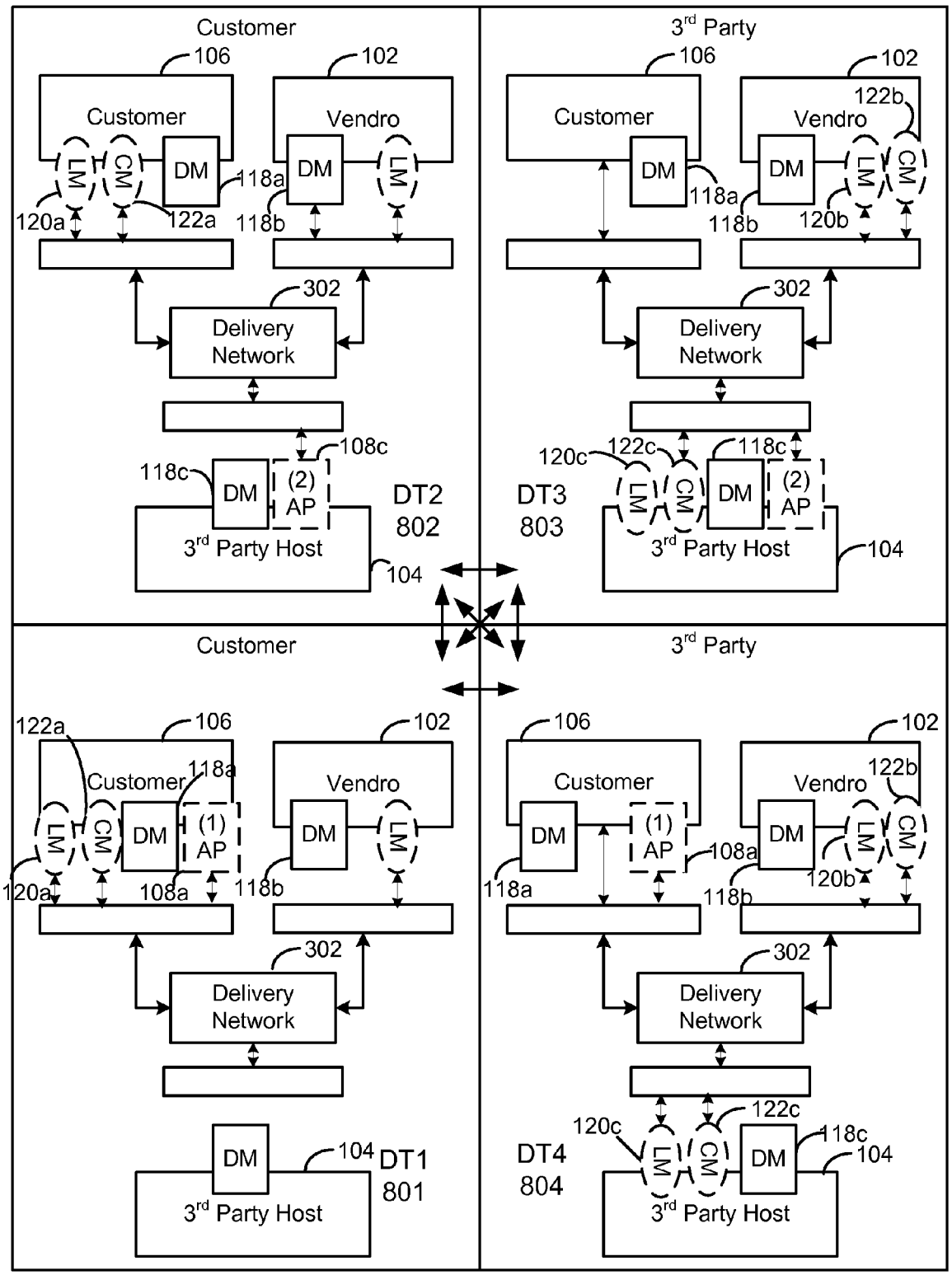
FIG. 8 is a block diagram of example deployment templates that may be used in the system of FIG. 1.

FIG. 8 is a block diagram 800 of example deployment templates 801, 802, 803, 804 that may be used in the system of FIG. 1. In general, as already referenced, such deployment templates may provide a guideline to the deployment manager 118 for making deployment decisions. In the example of FIG. 8, four coarse-grained deployment templates 801, 802, 803, 804 are described which are sufficient for making high level decisions about redistributing, reconfiguring, and re-licensing the appliance 108 an its components. The deployment templates 801-804 represent basic templates, and their refinements may be stored as further templates. Thus, the deployment templates 801-804 and similar deployment templates may be used to simplify deployment policies and decision logic during runtime of an appliance.

As shown, the deployment template 801 may include the license and configuration managers 120a, 122a at the customer 106 along with the appliance 108a, while the deployment managers 118a, 118b, and 118c are located at each site 102, 104, 106.

The deployment template 802 may include the license and configuration managers 120a, 122a at the customer 106, while the deployment managers 118a, 118b, and 118c are located at each site 102, 104, 106. The appliance 108c itself is at the host 104 for use over the delivery/channel 302.

In contrast, the third deployment template 803 may include the license and configuration managers 120c, 122c at the host 104, while the deployment managers 118a, 118b, and 118c are again located at each site 102, 104, 106. Instances of the license manager 120b and the configuration manager 120b also may occur at the vendor 104. The appliance 108c itself is at the host 104 for use over the delivery/channel 302. Finally, the fourth deployment 804 is illustrated in FIG. 8, and is similar to the third deployment template 803, with the primary exception that that the appliance is deployed at the customer 106.

A deployment template may have the following example structure and contents, as shown in FIG. 9:

Code Section 9

```
Deployment-Template {
    Template-Name: <name of template>
    Appliance-Location: <localhost/remote ip address>
    LM-Location: <localhost/remote ip address>
    CM-Location: <localhost/remote ip address>
}
```

FIG. 9 is a block diagram of the deployment manager 118 of FIG. 1. In FIG. 9, the deployment manager 118 is at the top of the management hierarchy in the system 100 of FIG. 1, and reports to a human administrator using an appropriate GUI, as described and illustrated herein. The deployment manager 118 may be initialized by a deployment supervisor 902 providing a set of initialization documents 904 that describe the system landscape, a set of suitability constraints, and a deployment strategy. These are first described below, followed by the remainder of an example deployment management protocol.

In the present context, system landscape 101 may refer to a model of the appliances/components, their locations, operational interfaces and associations in a particular system environment and under the control or access of a single domain administration. System landscape models can become relatively complex and large, and a System Landscape Directory (SLD) 906 may be used to store these complex model elements. In the case of this system for licensing and configuration management, the following entries may be created in an already existing directory, where each entry is a data-structure {Name, Type, Operations{ . . . }, Associations { . . . }, URL}, as shown in Code Section 10:

---
Code Section 10
---

```
Name: <Appliance-Registry>
   Type: Registry/ Database
   Operations: {add, remove, query, browse, update}
   Associations: {other registries, references
   registered appliances};
   URL: <registry-url>
Name: <Appliance-Identity>
   Type: ApplianceLocal/ ApplianceRemote;
   Operations {init, stop, migrate, check-status};
   Associations: {interacts with other appliances,
   registered with registry, configured by
   Configuration-Manager};
   URL: <appliance-url>
Name: <License-Manager>
   Type: LicenseManagerLocal/ LicenseManagerRemote
   Operations {init, stop, migrate, check-status};
   Associations: {send license to configuration
   manager};
   URL: <appliance-url>
Name: <Configuration Manager>
   Type: ConfigManagerLocal/ COnfigManagerRemote
   Operations {init, stop, migrate, check-status};
   Associations: {configures appliances, registered with
   registry, configured by Configuration-Manager};
   URL: <config-url>
Name: <Deployment Manager>
   Type: DeploymentManagerLocal/ DeploymentManagerRemote
   Operations {start, stop, deploy};
   Associations: {with license manager};
   URL: <deploy-url>
```

Referenced, above, suitability constraints may refer to general system constraints that define thresholds on the operation of various system components. A suitability constraint document may contain various suitability entries, such as a constraint type (e.g., CPU utilization or cost), a constraint function (e.g., GREATER-THAN or ABOVE), a constraint reference value (e.g., 75% or $1,000), an evaluator such as an identifier of a component that does evaluation of function and reference value(s) (which may runs as a daemon directly on a source that can provide the input to the function under observation), and a (controller, result), where a result may be, e.g., true/false, and where identifiers of a component that uses the result of an evaluation to perform some action, along with the relevant result of that action.

Also referenced above, a deployment strategy may refer to a set of rules implemented by a consumer of a suitability constraint entry above in order to (a) determine what the deployment action should be given a suitability result and (b) select from different deployment options, given a set of choices. The resultant deployment action may include a change in the licensing or configuration settings of the appliance 108.

The deployment manager 118 is at the top of the controller hierarchy in the system. An example protocol is provided below with reference to a similarly-numbered sequence of messages/operations in FIG. 9. Specifically, the protocol may include the following messages/operations.

First, in a "define landscape" operation (1), a supervisor 902 submits the system landscape, suitability constraints and deployment strategy documents 904 to a landscape directory 906, which maintains the documents 904 for the deployment controller 124. Every update may set one or more flags (e.g., "landscape-updated," "constraints-updated," or "strategy-updated") whenever there is a new update to any of the documents.

Second, in a "get landscape description" operation (2), the deployment controller 124 polls the landscape directory 906 every time-interval t (which may be tuned in the system) in order to retrieve updates to the system landscape, constraints and strategy documents 904. The flags may be set to false (e.g., "landscape-updated," "constraints-updated," and "strategy-updated").

Third, in a "deployment set-up" operation (3), the deployment controller 124 may use the system landscape descriptions to (i) ensure that the components defined in the description are available, (ii) ensure that the configuration (operating) parameters are compliant with those in the suitability constraints and (iii) ensure that there exists a license that corresponds to the set of components and configuration required. The license is packaged with the appliance descriptions referenced by the system landscape.

Fourth, in an "init-suitability monitoring" operation (4), the deployment controller 124 also may set one or more monitors as the deployment observer(s) 128, depending on the set of suitability-constraint-types to be controlled.

Fifth, at a "set-monitoring points" operation (5), each deployment observer 128 may then register with a predefined evaluator daemon running on the information provider for the constraint-type it needs to monitor.

Sixth, in a "get-suitability status" operation (6), the deployment observers 128 collect information from the daemons on a particular monitoring time interval as well, tuned according to the criticality of the appliance.

Seventh, in a "raise-suitability flag" operation (7), it is judged whether there is a particular result from a suitability evaluation for which the deployment controller 124 is registered, and, if so, then this is raised as an error flag or alert with the deployment controller 124.

Eighth, in a "suitability-control action" operation (8), the deployment controller 124, on receiving a suitability flag, may then perform some control action on the appliances, licensing, or configuration in the system landscape. Suitability control actions are based on the selection of a deployment template, which, as referenced above (e.g., with respect to FIG. 8), may lead to changing the physical machine or location where the appliance is hosted, changing the type of license or one of its parameters (e.g. users, expiry) to save cost, ensure availability, or gain some other advantage, and changing configuration parameters of the appliance's host including the amount of memory, processing and storage available.

Ninth, in a "suitability report" operation (9), the supervisor 902 may request a report from the deployment controller 124 on the landscape's performance with respect to its suitability constraints.

Tenth and finally in the example of FIG. 9, in a "modify-landscape" operation (1), the deployment controller, during normal operation, may receive an update to its landscape and suitability constraints, as also indicated in (1).

Although the above operations are presented sequentially, it will be appreciated that the operations may be performed in a different order, or iteratively, or intermittently, as would be appropriate to achieve a desired effect. Further, some operations may be admitted, and additional operations, not explicitly described here may be included. Similar comments apply to FIGS. 10 and 11, as well.

FIG. 10 is a block diagram of the license manager 120 of FIG. 1. As described herein, the license manager 120 acts second in the control hierarchy of the system 100. The license manager 120 may accept an instance of a license-document 1004 (as shown in FIG. 6) or some update to an already loaded instance of a license document. The license manager 120 has "read" and "write" (i.e. control) access to limited points in the appliance 108 and associated configuration, which may be used to determine the compliance of the appliance's operation with the terms in the license. While the deployment manger 118 is concerned with a wider range of suitability constraints, the license manager 120 is fixed on maintaining the compliance of the licenses of various appliances that may be installed in the system landscape 100.

As with the deployment manager 118, an example protocol is provided below with reference to a similarly-numbered sequence of messages/operations in FIG. 10. Specifically, the protocol may include the following messages/operations.

First, in an "install-license" operation (1), the license for a given appliance (and its sub-components) is passed to the license manager 120 via the deployment manager 118, which also acts as the supervisor for the licensing compliance, and operational suitability constraint.

Second, in a "get-license" operation (2), the license controller of the license manager 120 polls a license store 1006 for new updates that may be provided from the deployment manager 118. A license document may be modified in part or in whole for a given appliance. The license manager 120 need not make decisions about how to resolve licensing conflicts, but knows how to detect them and to enact the control action passed down from the deployment manager 118.

Third, in a "set-license" operation (3), the license controller 132 of the license manager 120 also sets the parameters of the appliance's host and its configuration, necessary for compliance with the given license document.

Fourth, in an "init-license-monitoring" operation (4), one or more license observers 134 in the system may be employed to monitor for key licensing indicators included in the document 1004, which are a subset of the suitability constraints schema. The licensing observers 134 will also register with the evaluator daemons in the appliance 108 and on the host 104 for these constraint types, but interpret the indicators with respect to licensing as opposed to other types of decision inputs.

Fifth, in a set-monitoring-point" operation (5), the license-observers 134 register and bind with the daemons running on the appliance 108 or its host 104/106 that contains the confguration manager 122.

Sixth, in a "get-license status" operation (6), the constraint daemons periodically issue updates to the license observers 134.

Seventh, in a "raise-license flag" operation (7), if there is an unfavorable license compliance indicator, then a flag is raised to the license controller 132.

Eighth, in a "license-control action" (8), license control actions may include changing the terms, users, expiry or other fields in the license, or, in the extreme case, changing the entire license that is being enforced.

Ninth, in a "license report" operation (9), there may be periodically pushed or queried reports about the licensing suitability of the appliances running. This may also be a license control action, where there is no modification to the license that can be done to recover from the licensing unsuitability condition, such that the deployment manager 118 needs to be notified.

Tenth and finally in the example of FIG. 10, in a "modify license" operation (10), the license may be updated by the deployment manager for various reasons, such as, for example, changed requirements of the vendor 102, or changed preferences of the customer 106, or changed site parameters (e.g., available hardware).

FIG. 11 is a block diagram of the configuration manager 122 of FIG. 1. The configuration manager 122 is positioned at the bottom of the control hierarchy, which has direct access to the parameters of the appliance's host and the appliance's management interface. The configuration supervisor 1102 may be a privileged administrator or the interface provided to the deployment manager 118 and/or the license manager 120 respectively. As the configuration manager 122 can perform privileged actions on the host, it should be often evaluated for bugs and infection with malware. The general control/observation/operation principles of the configuration manager 122 follow those of the deployment manager 118 and the license manager 120, as described above.

As with the deployment manager 118 and the license manager 120, an example protocol is provided below with reference to a similarly-numbered sequence of messages/operations in FIG. 11. Specifically, the protocol may include the following messages/operations.

Specifically, first, in an "install-config" operation (1), a configuration document 1104 comes from an administrator 1102, and may be supplemented by parameters pushed from the deployment manager 118 and the license manager 120.

Second, in a "get-config" operation (2), the configuration manager 122 has the configuration controller 138 that periodically checks the availability of new configuration parameters from a configuration store 1106.

Third, in a "set-config" operation (3), various types of parameters may be set in the host of the appliance 108, which may impact its performance. Such parameters are referenced above and described in more detail, here. Specifically, roles 1108 may be set which for various access rights to the system as required by the appliance, as well as roles set to be used by the appliance's users. These may be applied to the application gateway of the host or directly to the appliance, given that it contains an embedded checkpoint. However, in some instances, the deployment manager 118 may take on the role of checkpoint and application gateway. Other examples include interfaces, including some user and application interfaces 1110 that may be customized for users and usage of the appliance. Thus, as the appliance may need to interact with other appliances or legacy systems of the customer, it may be preferable that the look-and-feel are customizable to that desired by the customer. Other examples include business objects related to business logic 1112 that also may need to be customized to the parameters of the customer owning the appliance. For example, locales, thresholds, key performance indicators, currency and taxation parameters may be some of the variables that are customizable in the system landscape. In another example, database instances 1114 and tables may need to be created or dropped, while in a final example, an operating system 1116, which may be used to load drivers, set storage sizes and utilization thresholds required for the optimal performance of the appliance, also may be specified.

Fourth, in an "init-config monitoring" operation (4), the configuration observer 140 may be set with the now refined suitability constraints from the configuration document 1104.

Fifth, in a "set-monitoring point" operation (5), one or more daemons may run on the host that can provide information about the constraints of interest for making configuration decisions.

Sixth, in a "get-config status" operation (6), the configuration observer 140 periodically receives updates from the daemons on the compliance of the host with the suitability constraints.

Seventh, in a "raise-config flag" operation (7), if a configuration suitability constraint is broken, a flag is raised with the configuration controller 138.

Eighth, in a "config-control action" operation (8), a configuration control action may change a parameter in the host's settings (such as a role or availability of an interface).

Ninth, in a "config-report" operation (9), reports may be sent to the administrator or to the deployment manager 118 or the license manager 120.

Tenth and finally in FIG. 11, in a "modify-config" operation (10), the configuration document 1104 may be updated during runtime.

Figure 12:
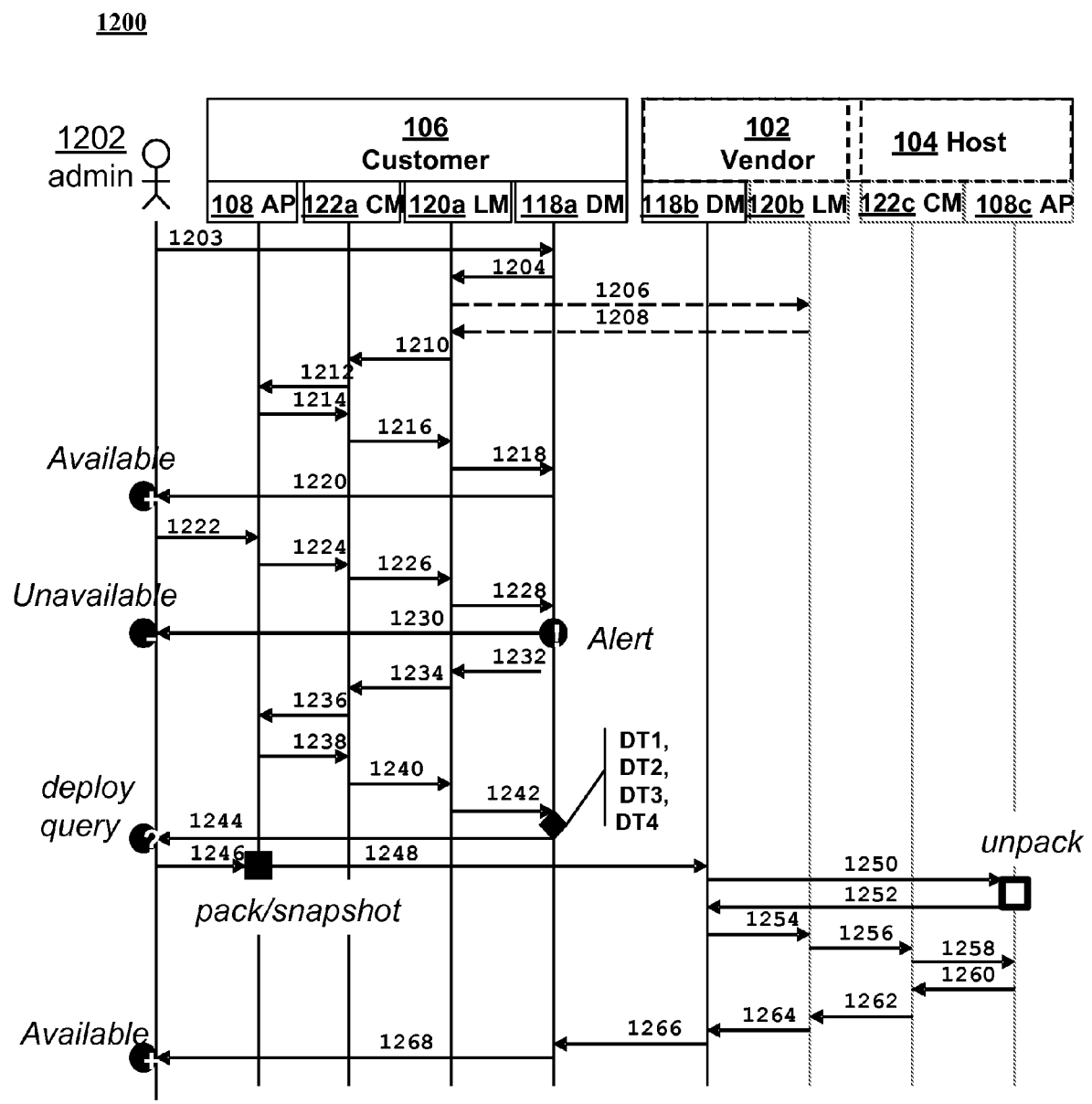
FIG. 12 is a timing diagram of a managing and switching protocol for operating the system of FIG. 1.

FIG. 12 is a timing diagram 1200 of a managing and switching protocol for operating the system of FIG. 1. More specifically, this protocol represents an example of how the different responsibilities for deployment, licensing, and configuration may be integrated; e.g., their interaction points and how they collaborate towards maintaining the compliance of the appliance, low binding of appliance to host, and low human intervention needed for making complex deployment, configuration and licensing decisions. The protocol may be referred to herein as DMA (Deployment Monitoring and Switching) and is composed of 3 phases (1) Initial Deployment (shown as operations 1203-1220), (2) Usage and Monitoring (shown as operations 1222-1242) and (3) Switching/Appliance Migration (1244-1268).

In the example of FIG. 12, the initial deployment of the appliance 108 is made using deployment template DT1 801 first response option 122a FIG. 1, where the customer 106 takes the responsibility for hosting, configuration, and licensing management. Further, although shown separately in FIG. 12, the vendor 102 and host 104 are not substantively distinguished from on another in FIG. 12, for the sake of simplicity and brevity. Of course, as described herein, the host 106 may in fact be a completely separate entity than the vendor 102.

In the initial deployment operations, an initial appliance request is dispatched from the human administrator 1202 to the deployment manager 118a (1203). This may result in the deployment manager 118a communicating with the license manager 120a to request an activation of the relevant appliance license (1204). If necessary, a request to renew the relevant license may be made (1206), e.g., using the Code Section 11, in which the term "cont" refers to an appliance container and the term "comp" refers to an appliance component:

At Customer C:

---
Code Section 11

```
forEach(cont in AP) {
forEach (comp in cont) IF (isExpired(license(comp))) THEN
    {
        V := checkVendor(cont); /* checks if there is a need to change the
            current vendor of the appliance's
            container */
        IF (V = cont.vendor) THEN
            order := renew-order(cont, V); /* note that renewal-order
                        extends purchase-order */
        ELSE order := purchase-order(cont, V);
        GOTO Order-Appliance(order); /* in management lifecycle */
    }
}
```
---

This request may result in a response (1208) to the renew license request, which occurs at the vendor of an appliance, appliance container, or appliance component, depending on at what degree of granularity the license request was invoked. Given that the appliance is itself a container (i.e. a root container), the protocol may be described from the perspective of license renewal for a container. Specifically, for each vendor license manager 120b, then an updated license may be returned if all components are valid according to the license terms.

Once licensing is validated, then the license manager 120a may send a configure appliance request (1210) to the configuration manager 122a, which may then send a load appliance request (1212) to the appliance. The appliance may then send a response (1214) indicating loading of the appliance to the configuration manager 122a, which may then a response (1216) indicating successful loading and configuration of the appliance, so that the license manager 120a may alert (1218) the deployment manager 118a that the license has been activated, so that the deployment manager 118a may send a response (1220) to the administrator 1202 (e.g., to an available user interface) that the deployed appliance is now available.

In the Usage and Monitoring operations of the protocol (shown as operations 1222-1242), the administrator 1202 may use the user interface of the deployment manager 118a or otherwise use the appliance 108 (1222). At some point, the appliance 108 may provide (1224) a configuration status, whereupon the configuration manager 122a may send a message (1226) to the license manager 120a of the licensing status, and thereafter the license manager 120a may notify (1228) the deployment manager 118a of an overall deployment status.

In the example of FIG. 12, an alert occurs at this point according to which one or more states of the system may be set to unavailable (e.g., any of the managers 118a-122a), which may then be provided to the GUI (1230). At this point, the deployment manager 118a may proactively send a licensing query (1232) to the license manager 120a, which may then send a configuration status query (1234) to the configuration manager 122a.

Then, the configuration manager 122a may initiate (1236) a root cause diagnosis query, and then receive (1238) a root cause diagnosis response. The configuration manager 122a may then send (1240) a configuration diagnosis response, and the license manager 120b may analogously send (1242) a licensing diagnosis response.

In a final set of example messages/operations, a switching of the appliance 108 may occur, e.g., based on a selected deployment template. More particularly, a query (1244) to migrate an application on a selected deployment template may result in an order (1246) to create a copy of the appliance, and then request that the deployment manager 118b prepare (1248) a copy of the appliance for deployment.

Then, a copy of the appliance in question may be delivered (1250) to one or more selected hosts, where the packing (snapshot)/unpacking refer to conventional techniques to reduce a size of the appliance deliverable/executable. Then the appliance may be deployed at the new host location and notification (1252) sent to the deployment manager 118b accordingly. This may be followed by a request (1254) to activate the license, whereupon the license manager 120a may update (1256) a configuration request, re-load (1258) the appliance request, and receive (1260) a response that the re-loading has occurred. The vendor/host configuration manager 122c may send (1262) an updated configuration response, and the license manager 120b may send (1264) a license activation response. Finally, the deployment manager 118b may communicate (1266) with the deployment manager 118a to send a deployment completed response, and the deployment manager 118a at the customer site may then send (1268) an appliance deployed response, e.g., by sending an 'available' message to the corresponding GUI.

Figure 13:
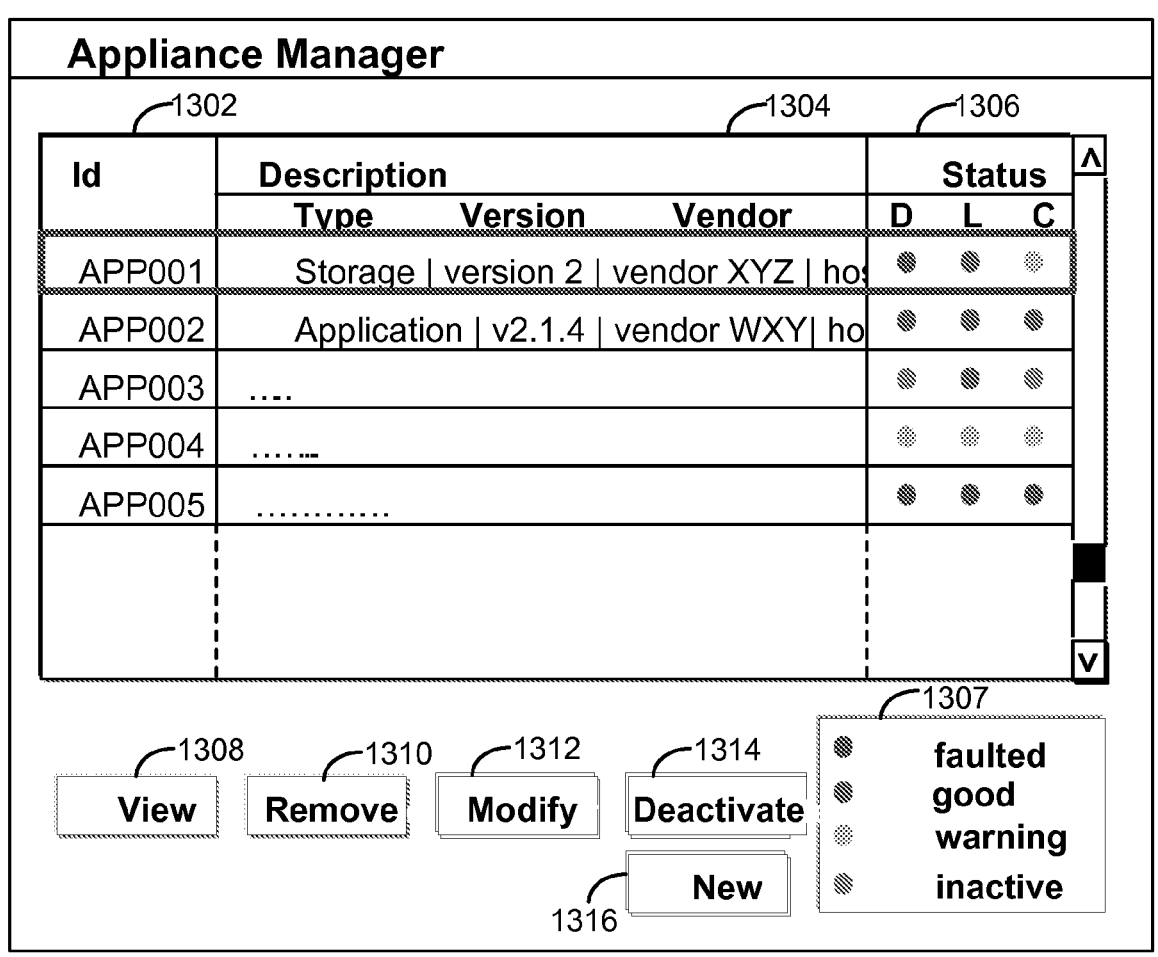
FIG. 13 is an example screenshot of a graphical user interface of the system of FIG. 1 illustrating an appliance management overview.

FIG. 13 is an example screenshot 1300 of a graphical user interface of the system of FIG. 1 illustrating an appliance management overview. That is, FIG. 13, as well as FIGS. 14-22, are examples of GUI screens that may be provided by the view generator.

As referenced, the screenshot 1300 provides an administrator at one or more of a vendor, host, or customer with an overview of currently deployed or available appliances. In the case of a customer, the appliances may be just those used by the customer, while the vendor and host may be provided with a similar view of appliances that span multiple customers. The screenshot 1300 includes a field 1302 in which the appliances are listed, as well as a field 1304 for a description of the appliance, including sub-fields for identifying a type, version, vendor, and/or host of the appliance.

A status field 1306 provides status updates regarding a deployment manager ("D"), a license manager ("L"), and a configuration manager ("C"), where a legend or key 1207 illustrates potential values for the status indicators, such as "faulted," "good," "warning," or "inactive," where such status indicators may be color-coded or otherwise distinguishable from one another to indicate a relevant status. In some implementations, the status indicators may themselves provide a link to a relevant manager. For example, a red or flashing light under "L" may indicate that a license violation has occurred, or may soon occur, so that a user may click on this status indicator to obtain further relevant information about the problem.

Figure 14:
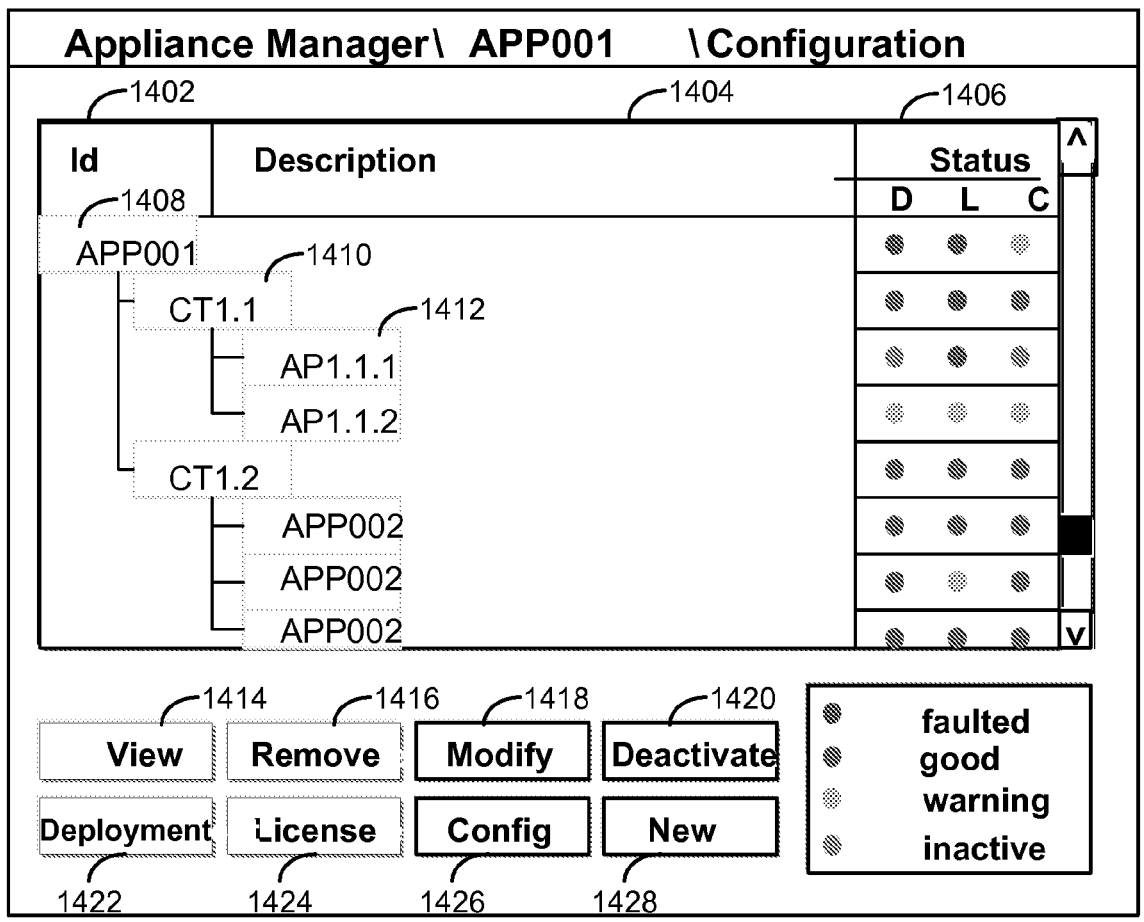
FIG. 14 is an example screenshot of a graphical user interface of the system of FIG. 1 illustrating an appliance management view.

Further in FIG. 13, buttons 1308 and 1312 may lead to a screenshot 1400 of FIG. 14 or similar screen, while buttons 1310 and 1314 provide for removal or deactivation of a selected appliance. Finally, a button 1316 provides for creation of a new appliance, as described below, and such as may occur FIG. 15.

FIG. 14 is an example screenshot 1400 of a graphical user interface of the system of FIG. 1 illustrating an appliance management view. In FIG. 14, an ID field 1402 and a description field 1404 are provided, which, along with a status field 1406, provide a more detailed view of a particular appliance that may have been selected from the screen 1300 of FIG. 13. The view includes an ID of the appliance 1408, where the appliance itself includes a container 1410 and an included application 1412. Buttons 1414-1428 provide for, respectively, a viewing, removal, modification, deactivation, deployment, licensing check, configuration check, and creation (new) of an appliance. More specifically, selection of the remove button 1416 or the deactivate 1420 may return a user back to the appliance view 1408. Meanwhile, the view button 1414 takes the user to a more detailed view of the selected item (as shown, e.g., in FIG. 21), while the modify button 1418 does the same but provides an editable version. The deployment button 1422 provides access to the screen of FIG. 18, while the button 'config' may take a user to the screen 2000 of FIG. 20. Finally in FIG. 14, the button 'new' 1428 allows a user/administrator to easily create new appliances from existing appliances or software applications.

FIG. 15 is an example screenshot 1500 of a graphical user interface of the system of FIG. 1 illustrating a first screen of an appliance creation wizard. In FIG. 15, it is assumed that an administrator or other user wishes to create (e.g., purchase and configure) one or more appliances or components. Therefore the screen 1500 provides a column 1501 with selectable boxes with which the user may select an appliance(s) from a fields 1502-1508, including a field 1502 that identifies vendors for different appliances that are identified in field 1504, and which are each described in a field 1506, and priced in a field 1508. Then, buttons 1510-1514, respectively, allow the user to go back to a previous screen, forward to a next screen, or to cancel the appliance creation process.

Figure 16:
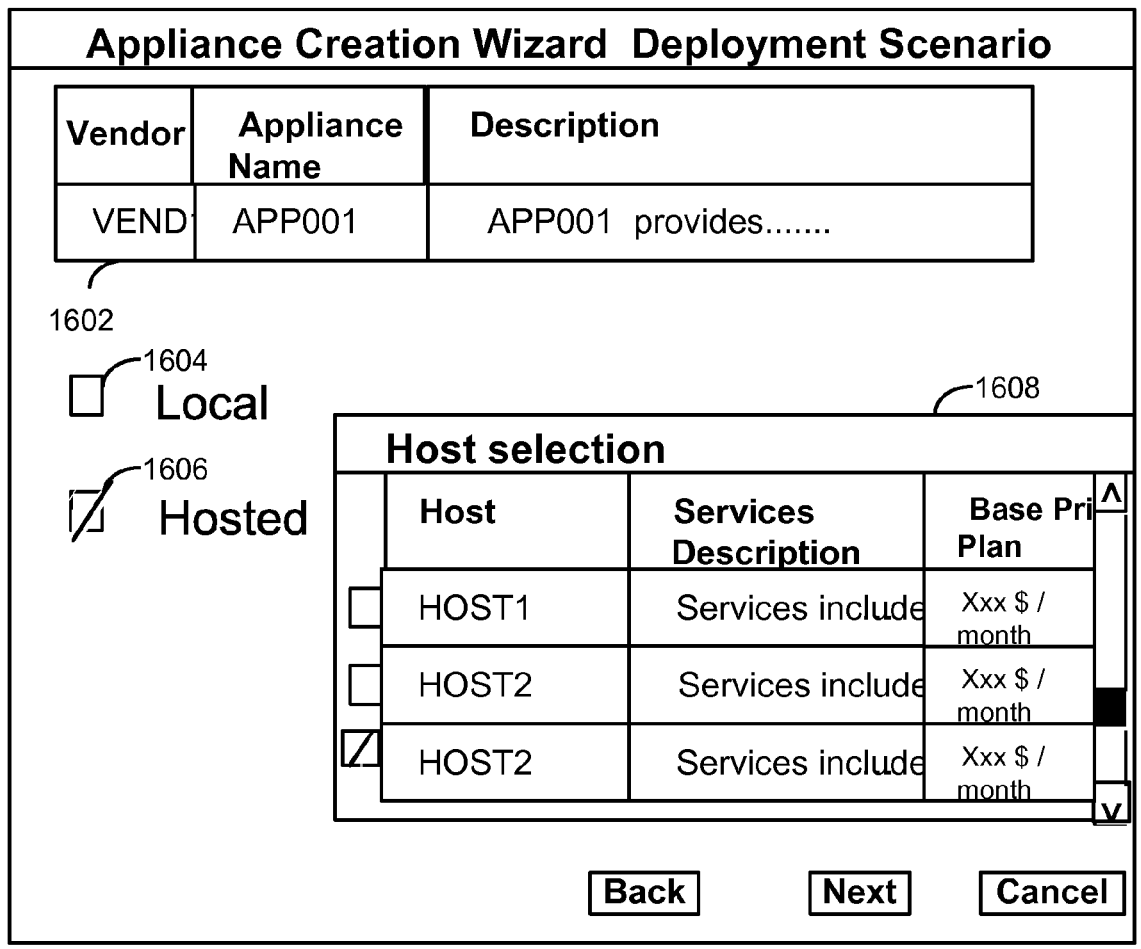
FIG. 16 is an example screenshot of a graphical user interface of the system of FIG. 1 illustrating a second screen of the appliance creation wizard of FIG. 15.

FIG. 16 is an example screenshot 1600 of a graphical user interface of the system of FIG. 1 illustrating a second screen of the appliance creation wizard of FIG. 15. In FIG. 16, box 1602 indicates that the application "APP001" was selected from screen 1500 of FIG. 15, and provides information about the selected application, such as a vendor and a description. Boxes 1604 and 1606 allow for an indication of whether the appliance will be hosted locally or at a third party, and, if the latter as in FIG. 16, a box 1608 provides for host selection including descriptive information of a plurality of potential hosts from which the user may select.

FIG. 17 is an example screenshot 1700 of a graphical user interface of the system of FIG. 1 illustrating a third screen of the appliance creation wizard of FIG. 15. In FIG. 17, a host has been selected from box 1608 of FIG. 16, and the user may select relevant hosting options, such as whether there will be collocation, dedicated equipment, $3^{rd}$ party management, 24/7 support, or other options, where, as shown, the various options may be provided in a field(s) 1706 according to option names provided in a field 1704 for selection using check boxes in field 1702. Price plans (as well as a totaled price) may then be provided in a field 1708.

FIG. 18 is an example screenshot 1800 of a graphical user interface of the system of FIG. 1 illustrating a fourth screen of the appliance creation wizard of FIG. 15. Somewhat analogously to FIG. 17, FIG. 18 provides for selection of appliance options, using, again, a field 1802 with selectable checkboxes, a field 1804 with option names, a field 1806 with the available options, and field 1808 with available pricing.

FIG. 19 is an example screenshot 1900 of a graphical user interface of the system of FIG. 1 illustrating a fifth screen of the appliance creation wizard of FIG. 15. Here, a total invoice is calculated reflecting the selected choices, including a section 1902 that reflects the appliance options previously referenced, and a section 1906 reflecting the described hosting options, and, finally, a section 1906 reflecting the associated costs.

FIG. 20 is an example screenshot 2000 of a graphical user interface of the system of FIG. 1 illustrating a sixth screen of the appliance creation wizard of FIG. 15. In FIG. 20, now that deployment options have been selected, a user may select between different configuration options for the hosting of the appliance. Various types of configuration options for various operating parameters are provided above, and for the purposes of FIG. 20 a section 2002 conceptually illustrates that various pre-configured options may be made available for selection. Of course, finer-grained control of configuring operating parameters also may be provided, as desired.

Figure 21:
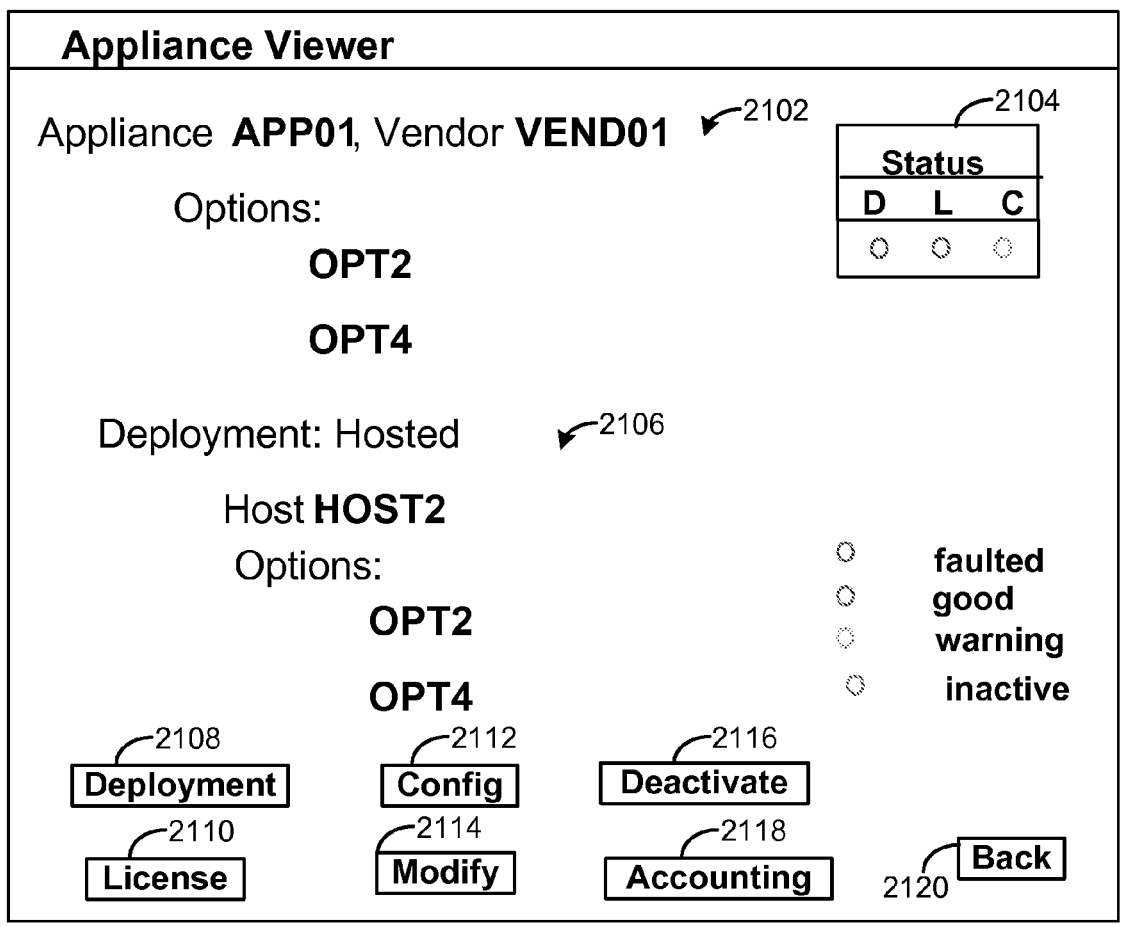
FIG. 21 is an example screenshot of a graphical user interface of the system of FIG. 1 illustrating a view of an appliance created with the appliance creation wizard of FIGS. 15-20.

FIG. 21 is an example screenshot 2100 of a graphical user interface of the system of FIG. 1 illustrating a view of an appliance created with the appliance creation wizard of FIGS. 15-20. As shown, the resulting appliance, along with its vendor and deployment options, may be shown in a section 2102, along with a status box 2104. Hosting options are shown in section 2106. Buttons 2108-2120 provide various options for managing or using the appliance, similar to those discussed above with respect to FIGS. 13 and 14. Specifically, a deployment button 2108 may take the user to a screen similar to the screenshot 1800 of FIG. 18, a license button 2110 would take a user to a screen 2200 of FIG. 22 (discussed in detail below), a config button 2112 may take a user back to the screen 2000 for selecting configuration options, a modify button 2114 may take a user to the screen 1400 for the particular application, a deactivate button 2116 may result in deactivation of the appliance, an accounting button 2118 may take a user to a screen similar to the screen 1900 to reflect current costs/pricing for the deployed appliance, and a back button 2120 may return the user to an immediately-previous screen.

FIG. 22 is an example screenshot 2200 of a graphical user interface of the system of FIG. 1 illustrating a view of a license(s) of the appliance of FIG. 21. FIG. 22 illustrates a license screen in which license terms of the deployed, configured appliance may be reviewed. For example, users may review the screen 2200 to ensure that a desired configuration or use of the appliance is allowed under existing license terms, or, if not, to modify the license terms (e.g., add more users). The screen 220 also may be reviewed when the license manager 120 detects a potential license violation and alerts the deployment manager 118 (which, it will be appreciated, may result in a visual indication or alarm within, e.g., the status field(s) 1306 or 1406 of FIGS. 13 and 14, respectively.

Accordingly, the screenshot 2200 may include reference to various license terms, such as those represented by the license data model of FIG. 6. For example, a section 2202 may include an initiator (vendor), receiver (e.g., customer), manager (e.g., host, such as the vendor), licensing scheme, product-ID, appliance purpose, and appliance version. A section 2204 on price ay include an agreed cost/price, a schedule of use, an expiration date, a number or type of users allowed, and a number of instances allowed. A terms section 2206 may include terms such as actions, constraints, and exceptions that may be associated with the license. Finally, a warranty section 2208 may include warranty terms such as a duration or repair/recovery terms of the warranty.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A system comprising:
 a configuration manager configured to set operating parameters of one or more software appliances for use of the one or more software appliances within a system landscape;
 a licensing manager configured to maintain compliance of the one or more software appliances with license terms, and configured to communicate with the configuration manager to maintain compliance of the operating parameters, as set by the configuration manager, with the license terms; and
 a deployment manager configured to
  provide a user interface for administration of the one or more software appliances therewith, including deployment of the one or more software appliances within the system landscape,
  communicate with the licensing manager to maintain compliance of the administration of the one or more software appliances with the license terms, and
  communicate with the configuration manager to manage the deployment relative to the operating parameters.

2. The system of claim 1 wherein the deployment manager is configured to provide the administration of the one or more software appliances based on an appliance data model using a schema that is common to a plurality of the one or more software appliances, the schema including configuration, license, and interface information for the appliance, as well as container information for separate functional components of the appliance, each container and component being associated with its own configuration, license, and interface information within the schema.

3. The system of claim 1 wherein the deployment manager and the license manager are configured to maintain the license terms using a license data model having a schema that is common to a plurality of the appliances and associated licenses, the schema including parties to the license, product information for the one or more appliances, license pricing information, and license terms.

4. The system of claim 1 wherein the deployment manager, the license manager, and the configuration manager are configured to maintain compliance of the license terms with the as-configured operating parameters based on a configuration data model having a schema that is common to a plurality of the software appliances, the schema including a reference to the one or more software appliances or a portion thereof, and properties of the one or more software appliances that may be modified based on the operating parameters.

5. The system of clam 1 wherein the deployment manager, the license manager, and the configuration manager are arranged in a hierarchy in which the deployment manager is configured to act as a supervisor to the license manager and the configuration manager, while the license manager is configured to act as a supervisor to the configuration manager, and wherein potential license violations are escalated through the hierarchy from a point of detection to the deployment manager for output thereof using the graphical user interface.

6. The system of claim 1 wherein the deployment manager comprises:
    a landscape directory configured to store a system landscape model including information about the system landscape, including the one or more appliances, the deployment manager, the license manager, and the configuration manager;
    a deployment observer registered with the license manager, the configuration manager, and the one or more appliances, and configured to collect status information thereabout; and
    a deployment controller configured to receive inputs including the system landscape model, the status information, suitability constraints governing operations of system landscape components, and a deployment strategy based on the suitability constraints, and configured to alter a status of one or more of the license manager, the configuration manager, and the one or more appliances, based on the inputs.

7. The system of claim 1 wherein the license manager comprises:
    a license store configured to receive a license document containing the licensing terms;
    a license observer configured to monitor licensing indicators included in the license document and associated with at least one of the one or more appliances and the configuration manager; and
    a license controller configured to report values of the licensing indicators to the deployment manager, and configured to enact control actions to resolve any license conflicts determined by the deployment manager from the values.

8. The system of claim 1 wherein the configuration manager comprises:
    a configuration store configured to receive a configuration document which includes allowed or desired values for the operating parameters, as received from one or both of the deployment manager and the license manager;
    a configuration observer configured to monitor the one or more appliances to determine current values of the operating parameters; and
    a configuration controller configured to adjust the current values based on the allowed or desired values.

9. The system of claim 1 wherein the system landscape includes one or more sites associated with a vendor of the one or more software appliances, a host of the one or more appliances, and a customer of the one or more appliances, with the system landscape being defined with respect to the customer, and wherein an instance of the deployment manager is located at each of the vendor, the host, and the customer.

10. The system of claim 1 wherein the deployment manager is configured to maintain compliance of the one or more software appliance by:
    determining a potential license violation, based on licensing indicators and current values of the operating parameters as received from one or both of the license manager and the configuration manager; and
    migrating the one or more appliances from a current host site thereof to a second host site, based on at least one of the potential license violation and deployment policies defined with respect to the operating parameters.

11. The system of claim 10 wherein the system landscape includes a vendor supplying the one or more software appliances, a host hosting the one or more software appliances, and a customer using the one or more applications, and wherein the deployment manager is configured to determine a deployment template governing a placement within the system landscape of the one or more appliances, the deployment manager, the license manager, and the configuration manager.

12. The system of claim 1 wherein the deployment manager is configured to migrate one or more of the license manager and the configuration manager among sites within the system landscape.

13. The system of claim 1 wherein the deployment manager comprises a view generator configured to output the graphical user interface including a view of the one or more appliances, and including status information for each of the deployment manager, the license manager, and the configuration manager.

14. A method comprising:
    setting operating parameters of one or more software appliances at a configuration manager, for use of the one or more software appliances within a system landscape;
    maintaining compliance of the one or more software appliances with license terms, at a license manager;
    executing communications between the license manager and the configuration manager to maintain compliance of the operating parameters, as set by the configuration manager, with the license terms;
    providing a user interface for administration of the one or more software appliances therewith, the administration including deployment of the one or more software appliances, the license manager, the configuration manager, and a deployment manager within the system landscape;
    executing communication between the license manager and the deployment manager to maintain compliance of the administration of the one or more software appliances with the license terms; and executing communication between the deployment manager and the configuration manager to manage the deployment relative to the operating parameters.

15. The method of claim 14, comprising:
executing communication between the license manager, the configuration manager, and the deployment manager in a hierarchical structure in which the configuration manner reports to the license manager and the license manager reports to the deployment manager.

16. The method of claim 14 wherein providing a user interface for administration of the one or more software appliances therewith, comprises:
detecting a potential violation of the license terms, based on the operating parameters; and
outputting a warning about the potential violation on the user interface.

17. The method of claim 14 comprising:
evaluating a plurality of deployment templates, each deployment template including a different distribution of the one or more appliances, the deployment manager, the license manager, and the configuration manager within the system landscape;
selecting a preferred deployment template; and
migrating one or more of the one or more appliances, the deployment manager, the license manager, and the configuration manager from a current distribution within the system landscape to a distribution matching that of the preferred deployment template.

18. A computer program product, the computer program product being tangibly embodied on a non-transitory computer-readable storage device and including executable code that, when executed, is configured to cause a data processing apparatus to:

execute a hierarchical structure in which a configuration manager associated with operating parameters of one or more software appliances reports to a license manager configured to monitor and enforce license terms governing usage of the one or more software appliances, and in which the license manager is configured to report to a deployment manager configured to govern a deployment and operation of the one or more appliances, the deployment manager, the license manager, and the configuration manager; and
output a graphical user interface using the deployment manager in which alerts are provided relative to each of the one or more appliances to provide information about potential license violations.

19. The computer program product of claim 18 in which the graphical user interface provides a listing of deployed software appliances within a system landscape, each being associated with a status indicator to provide a status of an associated instance of the deployment manager, the license manager, and the configuration manager.

20. The computer program product of claim 18 in which deployment templates are provided, each including a different distribution of instances of the one or more appliances, the deployment manager, the license manager, and the configuration manager, and
wherein the deployment manager is configured to select a current deployment template and to migrate or reload the one or more appliances, the deployment manager, the license manager, and the configuration manager based on the new single delegate which is also on the new template.

* * * * *

UNITED STATES PATENT AND TRADEMARK OFFICE
CERTIFICATE OF CORRECTION

| | |
|---|---|
| PATENT NO. | : 8,321,948 B2 |
| APPLICATION NO. | : 12/058273 |
| DATED | : November 27, 2012 |
| INVENTOR(S) | : Robinson et al. |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1183 days.

Signed and Sealed this
Seventh Day of May, 2013

Teresa Stanek Rea
*Acting Director of the United States Patent and Trademark Office*